(12) United States Patent
Koss et al.

(10) Patent No.: US 12,433,762 B2
(45) Date of Patent: Oct. 7, 2025

(54) SPINAL IMPLANT AND DELIVERY SYSTEM

(71) Applicant: Percheron Spine, LLC, Miromar Lakes, FL (US)

(72) Inventors: Scott A. Koss, Delafield, WI (US); Bob Gessert, Miromar Lake, FL (US)

(73) Assignee: Percheron Spine, LLC, Miromar Lakes, FL (US)

( * ) Notice: Subject to any disclaimer, the term of this patent is extended or adjusted under 35 U.S.C. 154(b) by 107 days.

(21) Appl. No.: 18/527,164

(22) Filed: Dec. 1, 2023

(65) Prior Publication Data

US 2024/0180714 A1 Jun. 6, 2024

Related U.S. Application Data

(60) Provisional application No. 63/429,449, filed on Dec. 1, 2022.

(51) Int. Cl.
*A61F 2/44* (2006.01)
*A61F 2/28* (2006.01)
(Continued)

(52) U.S. Cl.
CPC .......... *A61F 2/4455* (2013.01); *A61F 2/2846* (2013.01); *A61F 2/4601* (2013.01);
(Continued)

(58) Field of Classification Search
CPC ...... A61F 2/4455; A61F 2/446; A61F 2/4465; A61F 2/447; A61F 2/4611; A61F 2002/4495
See application file for complete search history.

(56) References Cited

U.S. PATENT DOCUMENTS 5,549,679 A * 8/1996 Kuslich .............. A61B 17/7098
606/279
6,174,311 B1 1/2001 Branch et al.
(Continued)

FOREIGN PATENT DOCUMENTS

EP 1514519 A2 3/2005
EP 1164979 B1 12/2005
(Continued)

OTHER PUBLICATIONS

WIPO, U.S. International Search Authority, International Search Report and Written Opinion mailed Apr. 18, 2024 in International Patent Application No. PCT/US2023/082176, 8 pages.

*Primary Examiner* — Ellen C Hammond
(74) *Attorney, Agent, or Firm* — Inskeep IP Group, Inc.

(57) ABSTRACT

A spinal implant and a delivery system for spinal surgery. The delivery device may be configured to deliver, articulate, and deploy the spinal implant in a disc space between a pair of vertebrae, and to deliver or inject a bone void filler to the spinal implant for deployment of the expandable mesh component. A mesh component may provide a reservoir for larger volumes of bone void filler and greater surface area for load distribution of the spinal cage. The mesh component may include pores through which bone void filler may interdigitate against the vertebral endplates. The delivery device may include a handle having components operable to attach the spinal implant for insertion, position and orient the spinal implant in a desired location and orientation and detach the spinal implant in place. A syringe, syringe gun, and/or packing rod may be utilized to deliver bone void filler through the delivery device.

8 Claims, 21 Drawing Sheets

(51) Int. Cl.
*A61F 2/46* (2006.01)
*A61F 2/30* (2006.01)
(52) U.S. Cl.
CPC ..... *A61F 2/4611* (2013.01); *A61F 2002/2835* (2013.01); *A61F 2002/30092* (2013.01); *A61F 2002/30579* (2013.01); *A61F 2002/3092* (2013.01); *A61F 2002/4628* (2013.01); *A61F 2002/4629* (2013.01)

(56) References Cited

U.S. PATENT DOCUMENTS

| | | |
|---|---|---|
| 6,730,095 B2 | 5/2004 | Olson, Jr. et al. |
| 6,929,647 B2 | 8/2005 | Cohen |
| 7,105,025 B2 | 9/2006 | Castro et al. |
| 7,220,282 B2 | 5/2007 | Kuslich |
| 7,591,852 B2 | 9/2009 | Prosser |
| 7,645,301 B2 | 1/2010 | Hudgins et al. |
| 7,799,079 B2 | 9/2010 | Hestad et al. |
| 7,815,682 B1 | 10/2010 | Peterson et al. |
| 7,892,239 B2 | 2/2011 | Warnick et al. |
| 7,976,549 B2 | 7/2011 | Dye et al. |
| 8,012,211 B2 | 9/2011 | Kuslich |
| 8,083,796 B1 | 12/2011 | Raiszadeh et al. |
| 8,092,464 B2 | 1/2012 | McKay |
| 8,226,722 B2 | 7/2012 | Pflum |
| 8,444,650 B2 | 5/2013 | Warnick et al. |
| 8,496,709 B2 | 7/2013 | Schell et al. |
| 8,506,629 B2 | 8/2013 | Weiland |
| 8,685,031 B2 | 4/2014 | Kleiner et al. |
| 8,709,088 B2 | 4/2014 | Kleiner et al. |
| 8,784,493 B2 | 7/2014 | Tsuang et al. |
| 8,828,018 B2 | 9/2014 | Ragab et al. |
| 8,906,028 B2 | 12/2014 | Kleiner et al. |
| 8,945,137 B1 | 2/2015 | Greenhalgh et al. |
| 8,956,414 B2 | 2/2015 | Asaad |
| 8,998,924 B2 | 4/2015 | Simpson et al. |
| 9,023,109 B2 | 5/2015 | Weiland |
| 9,060,877 B2 | 6/2015 | Kleiner |
| 9,168,152 B2 | 10/2015 | Raiszadeh et al. |
| 9,173,694 B2 | 11/2015 | Kleiner |
| 9,186,193 B2 | 11/2015 | Kleiner et al. |
| 9,265,622 B2 | 2/2016 | Schell et al. |
| 9,427,328 B2 | 8/2016 | Drochner et al. |
| 9,526,621 B2 | 12/2016 | Kuslich |
| 9,566,170 B2 | 2/2017 | Schell et al. |
| 9,622,879 B2 | 4/2017 | Taylor et al. |
| 9,642,723 B2 | 5/2017 | Cheng et al. |
| 9,655,748 B2 | 5/2017 | Greenhalgh et al. |
| 9,668,881 B1 | 6/2017 | Greenhalgh et al. |
| 9,833,335 B2 | 12/2017 | Weiland |
| 9,907,672 B1 | 3/2018 | Raiszadeh et al. |
| 9,925,058 B2 | 3/2018 | Wolfe et al. |
| 9,987,149 B2 | 6/2018 | Simpson et al. |
| 10,022,243 B2 | 7/2018 | Emery et al. |
| 10,064,742 B2 | 9/2018 | Taylor et al. |
| 10,092,412 B2 | 10/2018 | Drochner et al. |
| 10,092,415 B2 | 10/2018 | Weiland |
| 10,105,232 B2 | 10/2018 | Roche et al. |
| 10,111,756 B2 | 10/2018 | Wolfe et al. |
| 10,123,849 B2 | 11/2018 | Greenhalgh et al. |
| 10,143,560 B2 | 12/2018 | Pflum |
| 10,159,580 B2 | 12/2018 | Guizzardi et al. |
| 10,182,923 B2 | 1/2019 | Willis et al. |
| 10,195,053 B2 | 2/2019 | Kleiner et al. |
| 10,213,321 B2 | 2/2019 | Knapp et al. |
| 10,231,846 B2 | 3/2019 | Popejoy et al. |
| 10,238,507 B2 | 3/2019 | Greenhalgh et al. |
| 10,245,159 B1 | 4/2019 | Kleiner et al. |
| 10,285,825 B2 | 5/2019 | Pinal et al. |
| 10,292,833 B2 | 5/2019 | Sicotte et al. |
| 10,405,905 B2 | 9/2019 | Greenhalgh et al. |
| 10,420,591 B2 | 9/2019 | Snell et al. |
| 10,660,766 B2 | 5/2020 | Shi et al. |
| 10,702,397 B2 | 7/2020 | Simpson et al. |
| 10,709,577 B2 | 7/2020 | Lorang et al. |
| 10,835,388 B2 | 11/2020 | Milz et al. |
| 10,842,646 B2 | 11/2020 | Raiszadeh et al. |
| 10,874,524 B2 | 12/2020 | Bjork |
| 10,893,954 B2 | 1/2021 | Taylor et al. |
| 10,966,843 B2 | 4/2021 | Saito |
| 10,973,656 B2 | 4/2021 | Kleiner et al. |
| 11,000,386 B2 | 5/2021 | Willis et al. |
| 11,116,646 B2 | 9/2021 | Greenhalgh et al. |
| 11,141,289 B2 | 10/2021 | Knapp et al. |
| 11,147,682 B2 | 10/2021 | Trudeau et al. |
| 11,173,046 B2 | 11/2021 | Pinal et al. |
| 11,229,527 B2 | 1/2022 | Sicotte et al. |
| 11,298,161 B2 | 4/2022 | Snell et al. |
| 11,351,039 B2 | 6/2022 | Milella, Jr. et al. |
| 11,399,954 B2 | 8/2022 | Cannestra et al. |
| 11,446,159 B2 | 9/2022 | Mirda et al. |
| 11,504,249 B2 | 11/2022 | Milella, Jr. et al. |
| 11,510,710 B2 | 11/2022 | Frock et al. |
| 11,564,811 B2 | 1/2023 | Lorang et al. |
| 2002/0103540 A1 | 8/2002 | Cooper et al. |
| 2003/0074075 A1 | 4/2003 | Thomas, Jr. et al. |
| 2004/0024463 A1 | 2/2004 | Thomas, Jr. et al. |
| 2004/0143330 A1 | 7/2004 | Sazy |
| 2006/0235525 A1 | 10/2006 | Gil et al. |
| 2007/0191860 A1 | 8/2007 | Heinz et al. |
| 2010/0042219 A1 | 2/2010 | Antonacci et al. |
| 2013/0090734 A1 | 4/2013 | Pflum |
| 2014/0031939 A1 | 1/2014 | Wolfe et al. |
| 2014/0148907 A1 | 5/2014 | Gately |
| 2015/0112352 A1 | 4/2015 | Krause et al. |
| 2017/0238984 A1 | 8/2017 | Kleiner |
| 2017/0304076 A1 | 10/2017 | Palmer et al. |
| 2021/0015530 A1 | 1/2021 | Kleiner |
| 2021/0038404 A1 | 2/2021 | Milz et al. |
| 2021/0052397 A1 | 2/2021 | Popejoy et al. |
| 2021/0059821 A1 | 3/2021 | McManis |
| 2021/0251774 A1 | 8/2021 | Kleiner et al. |
| 2021/0369465 A1 | 12/2021 | Simoes et al. |
| 2022/0008223 A1 | 1/2022 | Knapp et al. |
| 2022/0104950 A1 | 4/2022 | Trudeau et al. |
| 2022/0133487 A1 | 5/2022 | Wolfe et al. |
| 2022/0168114 A1 | 6/2022 | Berry |
| 2022/0218496 A1 | 7/2022 | Hopson et al. |
| 2022/0226027 A1 | 7/2022 | Rogers et al. |
| 2022/0233331 A1 | 7/2022 | Kleiner et al. |
| 2022/0241091 A1 | 8/2022 | Greenhalgh et al. |
| 2022/0304824 A1 | 9/2022 | Milella, Jr. et al. |
| 2023/0015890 A1 | 1/2023 | Snell et al. |
| 2023/0041167 A1 | 2/2023 | Bjork et al. |
| 2023/0059830 A1 | 2/2023 | Milella et al. |

FOREIGN PATENT DOCUMENTS

| | | |
|---|---|---|
| EP | 0840580 B1 | 4/2007 |
| EP | 1841385 B1 | 3/2010 |
| EP | 1976461 B1 | 1/2012 |
| EP | 2419033 B1 | 12/2015 |
| EP | 2865341 B1 | 4/2016 |
| EP | 2877129 B1 | 10/2017 |
| EP | 3025661 B1 | 10/2017 |
| EP | 3228283 A1 | 10/2017 |
| EP | 3075359 B1 | 11/2017 |
| EP | 2908748 B1 | 4/2018 |
| EP | 2618753 B1 | 5/2018 |
| EP | 3357459 A1 | 8/2018 |
| EP | 3459502 A1 | 3/2019 |
| EP | 3305252 B1 | 5/2019 |
| EP | 3284428 B1 | 6/2019 |
| EP | 2675400 B1 | 1/2020 |
| EP | 3045151 B1 | 1/2020 |
| EP | 3915526 A1 | 12/2021 |
| WO | WO1996040015 A1 | 12/1996 |
| WO | WO2000024327 A2 | 5/2000 |
| WO | WO2000059413 A1 | 10/2000 |
| WO | WO2001047443 A1 | 7/2001 |
| WO | WO2002067786 A1 | 9/2002 |
| WO | WO2003039328 A2 | 5/2003 |
| WO | WO2004002340 A1 | 1/2004 |

(56) References Cited

FOREIGN PATENT DOCUMENTS

| | | |
|---|---|---|
| WO | WO2004093729 A2 | 11/2004 |
| WO | WO2005055869 A2 | 6/2005 |
| WO | WO2006079356 A1 | 8/2006 |
| WO | WO2006113771 A1 | 10/2006 |
| WO | WO2007084257 A1 | 7/2007 |
| WO | WO2007084842 A2 | 7/2007 |
| WO | WO2007090007 A1 | 8/2007 |
| WO | WO2007126713 A2 | 11/2007 |
| WO | WO2007146738 A2 | 12/2007 |
| WO | WO2010019289 A1 | 2/2010 |
| WO | WO2010121030 A2 | 10/2010 |
| WO | WO2012040152 A1 | 3/2012 |
| WO | WO2012105647 A1 | 8/2012 |
| WO | WO2012105649 A1 | 8/2012 |
| WO | WO2012112196 A1 | 8/2012 |
| WO | WO2014018802 A1 | 1/2014 |
| WO | WO2014061005 A2 | 4/2014 |
| WO | WO2015081240 A1 | 6/2015 |
| WO | WO2017181016 A2 | 10/2017 |
| WO | WO2017190460 A1 | 11/2017 |
| WO | WO2018136360 A1 | 7/2018 |
| WO | WO2019051260 A9 | 3/2019 |
| WO | WO2020181211 A1 | 9/2020 |
| WO | WO2021032698 A1 | 2/2021 |
| WO | WO2022098931 A1 | 5/2022 |
| WO | WO2022149089 A1 | 7/2022 |
| WO | WO2022187718 A1 | 9/2022 |

\* cited by examiner

SPINAL IMPLANT AND DELIVERY SYSTEM

RELATED APPLICATIONS

This application claims benefit of and priority to U.S. Provisional Application Ser. No. 63/429,449 filed Dec. 1, 2022 entitled Spinal Implant, which is hereby incorporated herein by reference in its entirety.

BACKGROUND OF THE INVENTION

Spinal disorders and conditions resulting in vertebral instability, degradation, or injury often necessitate surgical intervention to restore spinal stability, alleviate pain, and prevent further damage. One method for treating such disorders and conditions may include spinal fusion.

Spinal fusion is a procedure that aims to stabilize the spine by permanently fusing two adjacent vertebrae together, thereby limiting motion and promoting the natural healing process. During a spinal fusion procedure, a discectomy may be performed. An implant may then be subsequently inserted into the disc space. Bone void filler may also be inserted in the same disc space.

Since the spinal fusion process takes place over time, the spine may remain unstable until fusion is complete. Such instability may contribute to failure to fuse the adjacent vertebrae. Therefore, there is a need for a spinal implant that improves odds of success of fusion, provides stability during the fusion process, and is easily implantable so as to minimize trauma to the patient and the possibility of complications.

SUMMARY OF THE INVENTION

Disclosed herein are various devices, methods, and systems related to the delivery, deployment, and/or implantation of a spinal implant between a pair of adjacent vertebrae to induce spinal fusion.

In an example embodiment, a spinal implant device may be configured for implantation between a pair of adjacent vertebrae, such as in a space cleared between the vertebrae. The spinal implant may include a mesh portion for receiving and dispensing a bone void filler such as bone graft material and/or synthetic bone paste. The mesh portion may be compressed during delivery and expanded upon deployment. The mesh portion may be permeable such that the bone void filler may permeate through the mesh portion. The spinal implant may also include one or more openings through which bone void filler may be dispersed.

In an example embodiment, a delivery device may be configured to deliver the spinal implant to a target location, such as between a pair of adjacent vertebrae, and to deliver the bone void filler to the spinal implant. The delivery device may comprise a handle and at least one elongated element extending from the handle. The at least one elongated element may comprise an outer tube having a lumen through which an inner tube extends. The inner tube may include a delivery lumen through which the bone void filler may be delivered. The delivery device may be configured to be removably attached to the spinal implant, such as through a threaded connection.

In an example embodiment, the handle of the delivery device may be operable to adjust an angular orientation of the spinal implant with respect to the at least one elongated member of the delivery device.

In an example embodiment, the handle of the delivery device may be operable to lock the spinal implant in an angular orientation with respect to the at least one elongated member of the delivery device.

In an example embodiment, the handle may comprise a lumen which is in fluid communication with the delivery lumen of the elongated element of the delivery device.

In an example embodiment, the handle may be configured to receive a syringe, syringe gun, packing rod, or other device for delivering a volume of the bone void filler through the delivery lumen and into the spinal implant.

In an example embodiment, the handle may be configured to adjust an outlet of the delivery lumen between a sealed and an unsealed position.

In an example embodiment, the handle may include indicia to indicate whether the outlet is in the sealed position or the unsealed position.

In an example embodiment, the spinal implant may be attached to a distal end of the delivery device, with the spinal implant being substantially linearly aligned with the elongated element of the delivery device. A space may be cleared between a pair of adjacent vertebrae, such as through various procedures including a discectomy. The delivery device may be utilized to advance the spinal implant into the space between the adjacent vertebrae. The handle of the delivery device may be manipulated to unlock the spinal implant, adjust the spinal implant to a desired angular orientation, and release the spinal implant.

In an example embodiment, bone void filler may be injected through the delivery device and into the spinal implant, thereby expanding or deploying the mesh portion of the spinal implant. The bone void filler may be received and contained by the mesh portion of the spinal implant. In some cases, a portion of the bone void filler may permeate or interdigitate through the mesh portion of the spinal implant and/or one or more openings of the spinal implant so as to interface with adjacent vertebrae. The spinal implant may be detached from the delivery device, and the delivery device may be removed from the body.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
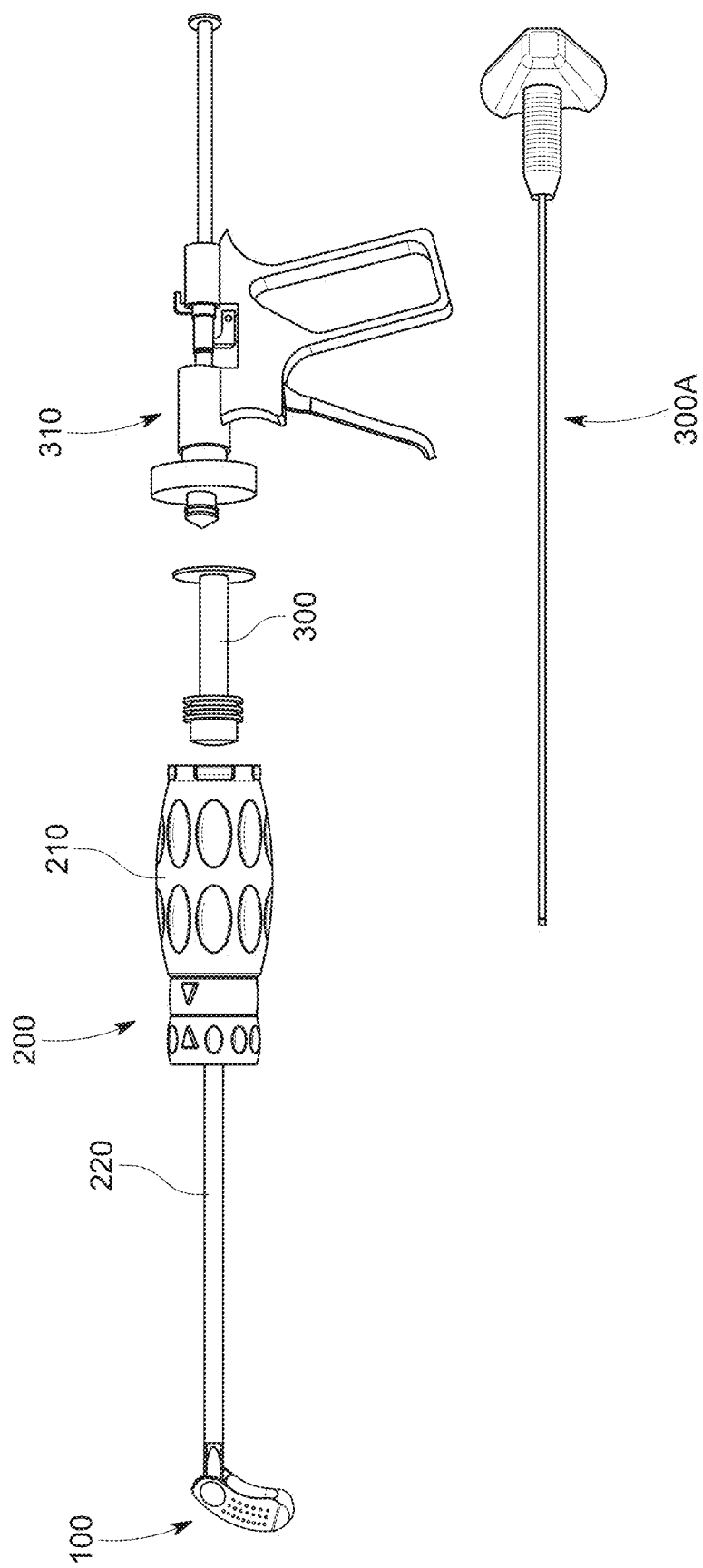
FIG. 1 is a is a side view of a spinal implant and delivery system in accordance with an example embodiment.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

While different embodiments may be described in this specification, it is specifically contemplated that any of the features from different embodiments can be combined together in any combination. In other words, the features of different embodiments can be mixed and matched with each other. Hence, while every permutation of features from different embodiments may not be explicitly shown, it is the intention of this specification to cover any such combinations.

For the purposes of this specification, use of the terms "about", "around", or "approximately" when referring to a value may be understood to mean within 10% of the stated value (either greater or lesser), inclusive.

Disclosed herein are various example embodiments of a spinal implant device. The spinal implant device may comprise a housing and an expandable mesh portion which may expand at least partially out of the housing to receive and contain a bone void filler. The housing may be adjustable between various angular orientations to suit different anatomies. The housing may include one or more openings through which the bone void filler may interface with the adjacent vertebrae.

The housing may comprise a rigid structure forming a rigid cage. The housing may comprise a substantially curved profile, or may be comprised of various other shapes. A proximal region of the housing may include a rotational hub to which a delivery device may be removably attached. The rotational hub may include a threaded opening to allow for a threaded, removable engagement between the spinal implant device and the delivery device. The rotational hub may rotate with respect to the housing such that the angular orientation of the housing may be adjusted with respect to the delivery device.

The opening of the rotational hub may rotate with the hub. The opening may also be utilized to deliver a bone void filler into a cavity formed in the housing. The opening may be adjustable between a sealed position and an unsealed position. In the sealed position, the opening may be sealed from the cavity so as to prevent premature delivery of bone void filler before the spinal implant device is in the desired position and/or orientation. In the unsealed position, the opening may be in fluid communication with the cavity.

In some cases, the opening may not be adjustable between a sealed and unsealed position. In such cases, the opening may be fixed in an unsealed orientation or position within the spinal implant device. Such a configuration may be desirable in cases in which the spinal implant device may be implanted in a linear (e.g., not angled) orientation, such as during treatment of a patient having scoliosis (e.g., on the concavity side).

The spinal implant device may include one or more openings through which bone void filler may interface with the adjacent vertebrae. For example, one or more surfaces of the spinal implant device may include a plurality of small apertures. As another example, one or more surfaces of the spinal implant device may include a single, larger opening. Additionally, one or more surfaces of the spinal implant device may include ribs or teeth to aid with retention in the space between vertebrae and prevent movement after implantation (e.g., prevent the spinal implant device from backing out of the disc space).

Various materials may be utilized to form the housing, such as but not limited to titanium, polyether ether ketone (PEEK) plastic, stainless steel, tantalum, various other metals, metal alloys, or plastics, and/or combinations thereof. The housing may be subtractively manufactured (e.g., machined) or additively manufactured (e.g., 3D printed). The housing may be anodized, or may have other surfaces coatings or treatments for promotion of bone ingrowth, including grit blasting, titanium plasma spray, hydroxyapatite, or various other coatings used in orthopedic or spinal implants.

The spinal implant device may also include a mesh portion, such as an expandable, secondary cage, which may be attached to the housing. The mesh portion may be attached so as to be positioned at least partially within the cavity of the housing. The mesh portion may be adjustable between a compressed configuration and an expanded configuration. In the compressed configuration, the mesh portion may be substantially tucked, compressed, or folded within the cavity of the housing or rigid cage. In the expanded configuration, the mesh portion may substantially expand out of the cavity to form a bag or sac shape.

The mesh portion may form an expandable mesh cage that may provide several benefits to the spinal implant system. For example, the mesh portion may contain the graft material, thereby preventing the graft material from migrating to other unwanted areas of the body. As another example, the mesh portion may provide load sharing, thereby reducing stress concentrations and distributing load across the vertebral endplates.

As yet another example, the mesh portion may also allow for a more compact implant profile during implantation, as the mesh portion can be tucked into the cavity of the housing during implantation, thereby reducing the size of the required incision needed for delivery, deployment, and implantation of the spinal implant device.

As yet another example, the use of the example embodiments of the spinal implant device described and/or shown herein may allow for a transforaminal lumbar interbody fusion (TLIF) or extreme lateral interbody fusion (XLIF) approach rather than, e.g., an anterior lumbar interbody fusion (ALIF) approach which requires cutting through, and later repairing, muscles in the lower abdomen.

The manner by which the mesh portion is attached to the housing may vary. As an example, the mesh portion may be attached to the housing by a tapered interference fit, such as by use of a tapered insert. The tapered insert may be utilized to sandwich the mesh portion with a matched taper within the cavity of the housing. The tapered insert may be forcefully inserted into the cavity of the housing, thus fixing the mesh portion in place. A weld or various adhesives may be added around the top seam of the interface to prevent the tapered insert from moving. Such a weld of adhesive may also aid in adhering the mesh portion itself to the housing, adding a second mode of mesh retention. Alternatively, snap-locks, screws, rivets, adhesives, threading, welds, or other fastening methods may be employed as primary and/or secondary attachment mechanisms between the housing and the mesh portion.

Various materials may be utilized to form the mesh portion, including but not limited to Nitinol, which may be heat set to form a desired expanded configuration (e.g., a sac or bag-shaped configuration) upon expansion. The mesh portion may alternatively or additionally be composed of various other materials, such as but not limited to stainless steel or titanium, which may be viewed as more inert and may simplify attachment of the mesh portion to the housing. The mesh portion may comprise one or more braided wires, such as braided Nitinol wires. Drawn filled tubing may also be utilized for visualization purposes.

The mesh portion may be configured to expand outwardly from the housing due to pressure from injection of a bone void filler into the mesh portion. The amount of bone void filler injected or otherwise introduced into the mesh portion may form one factor that determines the amount of load which the mesh portion shares with the housing.

The shape of the mesh portion, upon expansion, may affect both the amount of load share and the pressure that the mesh portion applies to the vertebral bodies on either side of the spinal implant device. Various profiles and shapes may be utilized. With example embodiments in which the mesh portion is taller, the mesh portion may be capable of taking more load off of the housing. Further, use of a larger area and flatter profile, rather than a curved, ball shape, may provide load support with less pressure. As an example, the mesh portion may have an area of about 4.0 $cm^2$ and a volume of about 10 cc. As a further example, the mesh portion may have an area of 2.0 $cm^2$ and a volume of about 5 cc. However, various other areas and volumes may be utilized as discussed in more detail below.

Also disclosed herein are various example embodiments of a delivery system which may be utilized to deliver, deploy, and/or implant the spinal implant device at a desired position and in a desired orientation. The same delivery system may additionally be utilized to deliver the bone void filler into the spinal implant device. Thus, the delivery system may be utilized to position the spinal implant device between a pair of vertebrae, orient the spinal implant device in a desired orientation, deliver a bone void filler to the spinal implant device, and detach the spinal implant device.

The delivery system may include an implant delivery device having a handle and an elongated element extending outwardly from the handle. The elongated element may comprise one or more tubes, such as an outer tube and an inner tube. The outer tube may include a lumen through which the inner tube extends. The inner tube may include a lumen through which the bone void filler may be delivered to the spinal implant device.

The elongated element of the implant delivery device may include a connector to which the spinal implant device may be removably attached. The connector may comprise a threaded member which threadably engages with the corresponding threaded opening of the rotatable hub of the spinal implant device. While the figures illustrate an example embodiment in which the implant delivery device includes a male threaded member, and the spinal implant device includes a female threaded opening, it should be appreciated that, in some example embodiments, the reverse configuration may be utilized.

The elongated element of the implant delivery device may include a plurality of locking teeth which may be formed by projectiles or indentations. The plurality of locking teeth of the implant delivery device may be configured to engage with corresponding locking teeth on a proximal region of the spinal implant device so as to lock the spinal implant device in a specific orientation with respect to the elongated element, such as during delivery.

The plurality of locking teeth of the implant delivery device may be positioned on an outer tube. When the outer tube is advanced distally, the locking teeth of the outer tube may engage with the corresponding locking teeth of the spinal implant device to lock the spinal implant device in a certain angular orientation and prevent pivoting or rotational movement. When the outer tube is retracted proximally, the locking teeth of the outer tube may disengage from the locking teeth of the spinal implant device such that the spinal implant device may rotate or pivot freely.

The implant delivery device may include a handle which may be operable to both lock/unlock the spinal implant device and pivot or rotate the spinal implant device with respect to the elongated element when unlocked. The handle may include one or more collars which may be rotatable, such as a locking collar and a tare collar. The locking collar may be utilized to advance or retract the outer tube and thereby lock or unlock the spinal implant device. The tare collar may be utilized to pivot or rotate the spinal implant device between a plurality of angular orientations with respect to the implant delivery device. However, it should be appreciated that the reverse configuration may be utilized. It should also be appreciated that a single collar may be utilized for both adjustment and locking/unlocking.

In use, the spinal implant device may first be attached to a distal end of the delivery device. The spinal implant device may be oriented in a straight, linear orientation with respect to the delivery device so as to minimize the size of insertion site on the body of the patient. The angular orientation of the spinal implant device may be locked in such a linear configuration during delivery.

The spinal implant may be inserted within a disc space between a pair of adjacent vertebrae and then unlocked to allow pivoting or rotational movement of the spinal implant. The spinal implant may then be reoriented to a desired angular orientation, such as by use of the handle of the delivery device. As the spinal implant is pivoted to adjust its angular orientation, the housing may rotate with respect to the rotational hub. In doing so, the opening of the rotational hub will gradually align with the delivery lumen of the delivery device such that the opening of the rotational hub is in fluid communication with the delivery lumen. It should be appreciated that such an unsealed configuration, in which the delivery lumen is in fluid communication with the opening, may persist over a range of different angular orientations.

Upon the spinal implant reaching a desired position and angular orientation within the disc space, a bone void filler may be delivered to the implant. The manner by which the bone void filler is delivered to the implant may vary in different embodiments. For example, a syringe may be filled with the bone void filler and then fluidly connected to the delivery device, such as by inserting and securing the syringe within an opening at a proximal end of the handle of the delivery device. The syringe may be so secured by use of threaded engagement, frictional engagement, magnetic engagement, clamps, fasteners, and the like.

A plunger or the like may then apply force against the bone void filler to drive the bone void filler out of the syringe, through the delivery device, and finally into the spinal implant device. In some example embodiments, a syringe gun may be utilized for additional pressure. In yet other example embodiments, a packing rod may alternatively or additional utilized for higher pressure as needed.

As the bone void filler enters the housing, the bone void filler will exert force upon the mesh portion, thereby causing the mesh portion to expand outwardly from the housing. Once the mesh portion fully expands, some of the bone void filler may interface with adjacent vertebral end plates through the mesh portion to spaces adjacent to the spinal implant device.

With the bone void filler delivered, the delivery device may be detached from the spinal implant device and removed from the body of the patient. As an example, the handle may be rotated so as to threadably disengage the delivery device from the spinal implant device. A plug or valve may optionally be utilized to prevent backflow of the bone void filler out of the spinal implant device during or upon removal of the delivery device. The spinal implant device, including expanded mesh portion and bone void filler, may then be left in the disc space between the vertebrae to aid in the spinal fusion process.

Various types of bone void fillers may be utilized, including bone graft materials and/or synthetic materials. Factors which may be considered when selecting a bone void filler may include flowability into the spinal implant device, potential clogging of the pores of the mesh portion to prevent extrusion, loading sharing, and osteoinduction/osteoconduction. The bone void filler may be composed of human bone autograft having relatively smaller chip sizes (e.g., less than 1 mm) to promote flowability. The bone void filler may be composed of human allograft, demineralized bone matrix fiber, synthetic filler, and the like.

The bone void filler may be composed of a combination of a flowable carrier with a solid element. The flowable carrier may comprise, e.g., demineralized bone matrix (DBM) paste. The solid element may comprise, e.g., cortico-cancellous chips (CCC). The ratio of the flowable carrier and solid element as a total volume of the bone void filler may vary. As an example, a ratio of 25% to 50% DBM paste may be utilized. Demineralized bone fibers may also be utilized as the bone void filler, or as a component of the bone void filler. As an example, the bone void filler may comprise, by volume, 33% DBM, 33% CCC, and 33% bone fibers. Various other ratios may be utilized.

Specific embodiments and aspects of embodiments will now be discussed. However, it should be understood that these embodiments are examples of the previous discussion. Hence, any of the previously discussed aspects, variations, and examples may, not only be combined with each other, but may also be combined with the specific embodiments described below.

FIG. 1 illustrates an example embodiment of a spinal implant and delivery system, including a spinal implant device 100, a delivery device 200, a syringe 300, a syringe gun 310, and a packing rod 300A. The spinal implant device 100 may be configured for implantation between a pair of vertebrae, such as in a disc space between adjacent vertebrae. The delivery device 200 may be configured to deliver the spinal implant device 100 to a desired location, orient the spinal implant device 100 at a desired angular orientation, and detach the spinal implant device. The syringe 300, syringe gun 310, and/or packing rod 300A may be configured to force a bone void filler 170 through the delivery device 200 and into the spinal implant device 100 as discussed herein.

It should be appreciated that not all of the components illustrated in FIG. 1 may be necessary for implant delivery/deployment/implantation and injection of a bone void filler. For example, the syringe gun 310 and/or packing rod 300A may not be necessary in certain embodiments of the system in which additional force provided by these components is not needed for injection or delivery of the bone void filler 170 to the spinal implant device 100.

Figure 2:
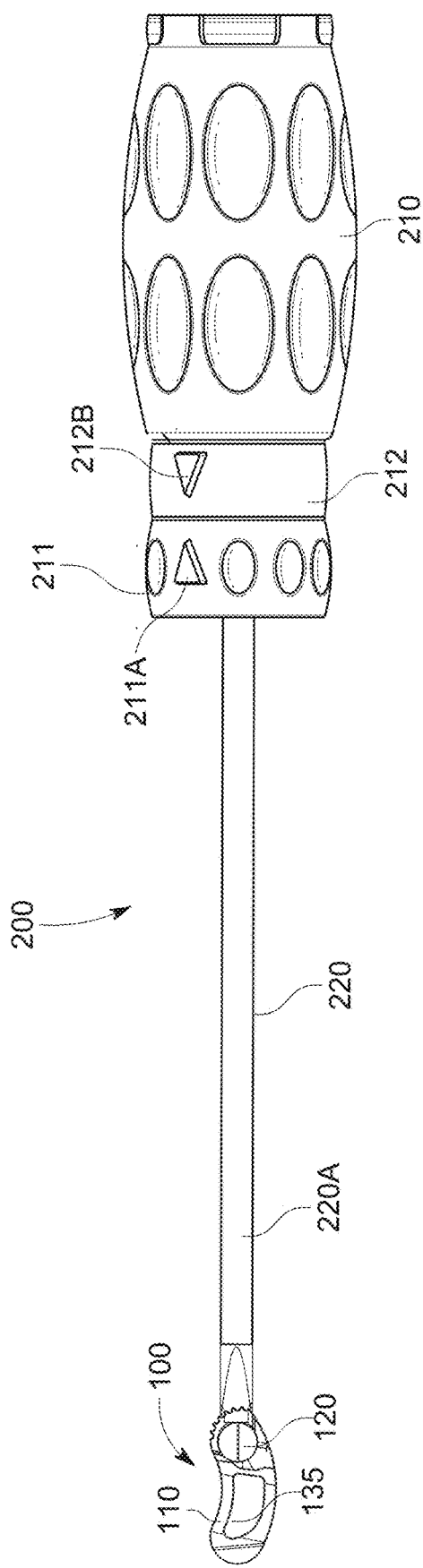
FIG. 2 is a side view of a spinal implant device and a delivery device in accordance with an example embodiment.

FIG. 2 illustrates an example embodiment of a spinal implant device 100 attached to a distal end of a delivery device 200. It should be appreciated that the respective sizes of the spinal implant device 100 and the delivery device 200 are not meant to be to scale, and that thus the spinal implant device 100 may be larger or smaller with respect to the delivery device 200 than shown in the example embodiment illustrated in FIG. 2.

The delivery device 200 may comprise a handle 210 and an elongated element 220 extending distally from the handle 210. The elongated element 220 may comprise a tubular member. The elongated element 220 may, in an example embodiment, comprise an outer tubular member 220A and an inner tubular member 220B as discussed in more detail below. The spinal implant device 100 may be removably attached to a distal end of the elongated element 220 or, more specifically, to a distal end of the inner tubular member 220B.

The manner by which the spinal implant device 100 may be removably attached to the elongated element 220 may vary in different embodiments. In an example embodiment, a proximal end of the spinal implant device 100 may be removably attached to a distal end of the elongated element 220 by threaded engagement. Rotation of the handle 210 may be operable to rotate the elongated element 220, such as the inner tubular member 220B, so as to threadably engage with or threadably disengage from the spinal implant device 100.

Figure 3:
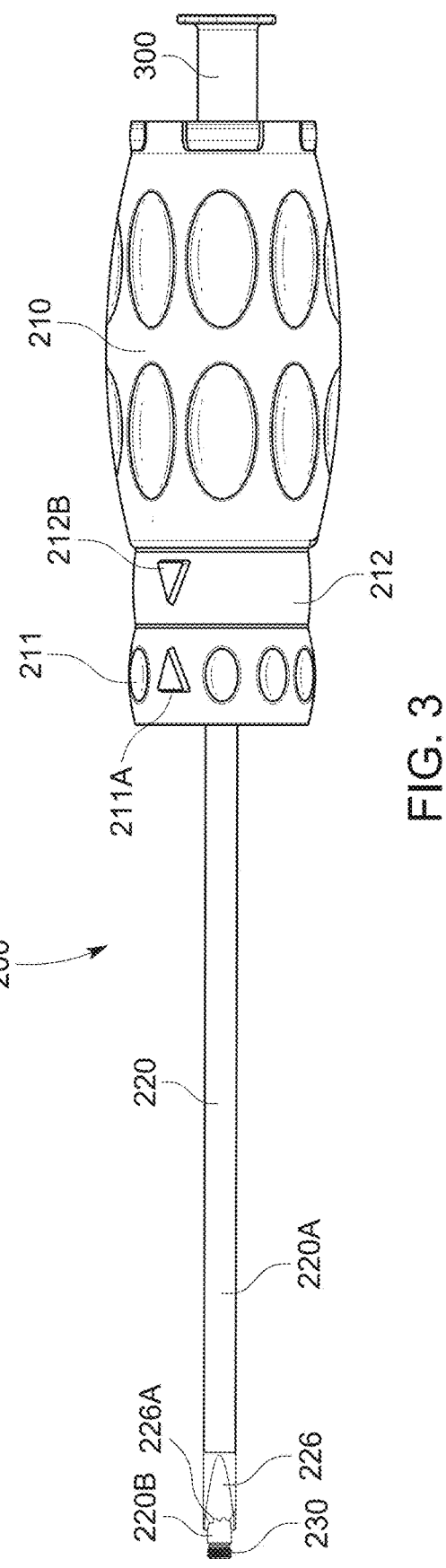
FIG. 3 is a side view of a delivery device in accordance with an example embodiment.

FIG. 3 illustrates an example embodiment of a delivery device 200 without any attached spinal implant device 100. The handle 210 of the delivery device 200 may at least partially comprise a material capable of withstanding repeated strikes from a hammering tool. In some example embodiments, a proximal portion of the handle 210 may comprise such a different material than the remaining distal portion of the handle 210. The proximal portion of the handle 210 may comprise a strike plate. The handle 210 may comprise ergonomic features such as shown in FIG. 3.

The handle 210 may include a lumen 215 into which various devices may be positioned to deliver a bone void filler 170 as described in more detail below. In the example embodiment shown in FIG. 3, it can be seen that a syringe 300 may be positioned within the lumen 215 of the handle 210 through an opening at a proximal end of the handle 210 so as to deliver bone void filler.

The handle 210 may comprise various adjustment mechanisms. The adjustment mechanisms may be operable to, e.g., engage or disengage the delivery device 200 with or from the spinal implant device 100, lock or unlock the spinal implant device 100 in one or more angular orientations, and/or adjust the spinal implant device 100 between a plurality of angular orientations with respect to the elongated element 220 of the delivery device 200.

In an example embodiment as shown in FIG. 3, the handle 210 may include an outer collar 211 and an inner collar 212. The outer collar 211 may be positioned distally adjacent with respect to the inner collar 212. One or both of the collars 211, 212 may be rotatable with respect to the handle 210. Rotation of one of the collars 211, 212 may be operable to lock or unlock the spinal implant device 100 in one or more angular orientations. For example, rotation of the outer collar 211 may be operable to lock/unlock the spinal implant device 100. However, various other configurations may be utilized in some embodiments. One or both of the collars 211, 212 may include various indicia 211A, 212A, 212B, 213A, 213B to provide a visual indication of the state (e.g., locked or unlocked, sealed or unsealed) and/or angular orientation of the spinal implant device 100 as discussed in more detail below.

Continuing to reference FIG. 3, it can be seen that an elongated element 220 may extend distally from the handle 210. The elongated element 220 may comprise an outer tube 220A and an inner tube 220B. The inner tube 220B may extend through a lumen of the outer tube 220A. The inner tube 220B may include its own delivery lumen 225 through which bone void filler 170 may be injected or otherwise delivered into the spinal implant device 100.

A distal end of the elongated element 220 may include a connector 230 for removably attaching the delivery device 200 to the spinal implant device 100. In an example embodiment as shown in FIG. 3, the connector 230 may comprise a threaded connector 230 positioned at a distal end of the inner tube 220B of the elongated element 220. However, it should be appreciated that, in some example embodiments, the connector 230 may instead be positioned at a distal end of the outer tube 220A. Additionally, while FIG. 3 illustrates an example embodiment in which the connector 230 comprises a male connector, it should be appreciated that, in some example embodiments, the connector 230 may instead comprise a female connector.

A distal end of the elongated element 220 may include a locking mechanism 226 for locking the spinal implant device 100 in one or more angular orientations with respect to the delivery device 200. In an example embodiment as shown in FIG. 3, the locking mechanism 226 may be positioned at a distal end of the outer tube 220A of the elongated element 220.

The locking mechanism 226 may comprise teeth 226A which may engage with corresponding teeth 150A on the spinal implant device 100. FIG. 2 illustrates an example embodiment in which the teeth 226A of the locking mechanism 226 are in engagement with the teeth 150A of the spinal implant device 100. When engaged, angular pivoting of the spinal implant device 100 with respect to the elongated element 220 is prevented. The teeth 226A of the locking mechanism 226 may be formed additively (e.g., by projections) or subtractively (e.g., by indentations). The shape, spacing, number, orientation, and configuration of the teeth 226A may vary in different embodiments, and thus should not be construed as limited in scope by the example embodiments shown in the figures.

Figure 4:
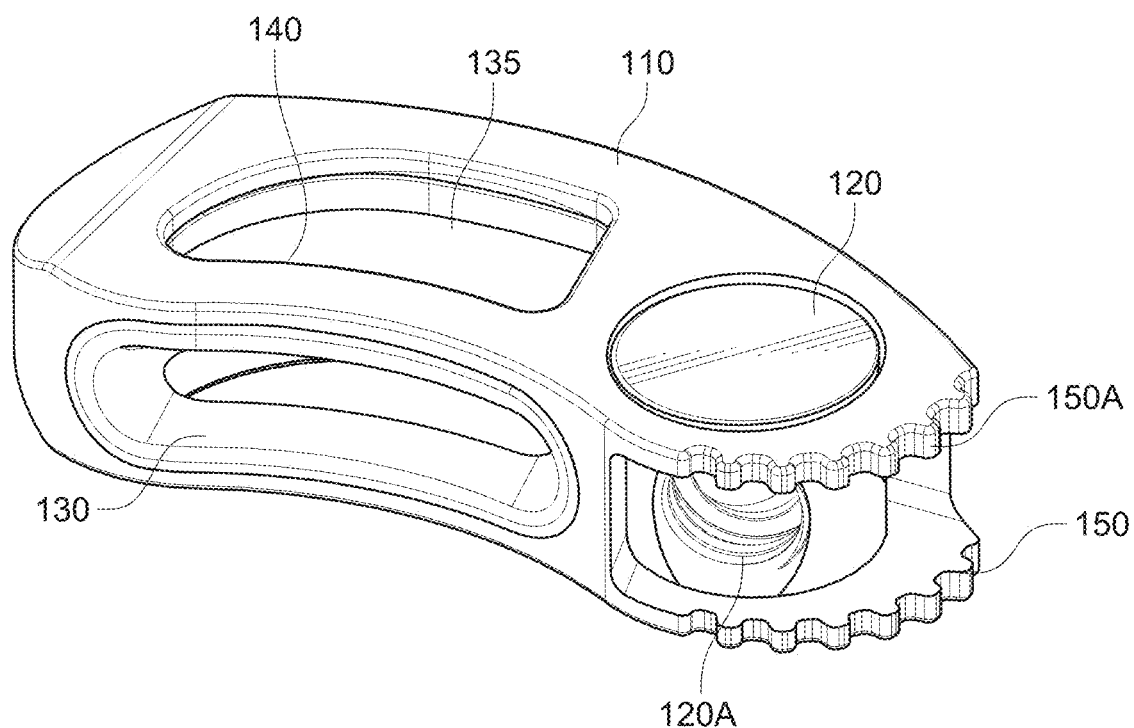
FIG. 4 is a perspective view of a spinal implant device in accordance with an example embodiment.
Figure 5:
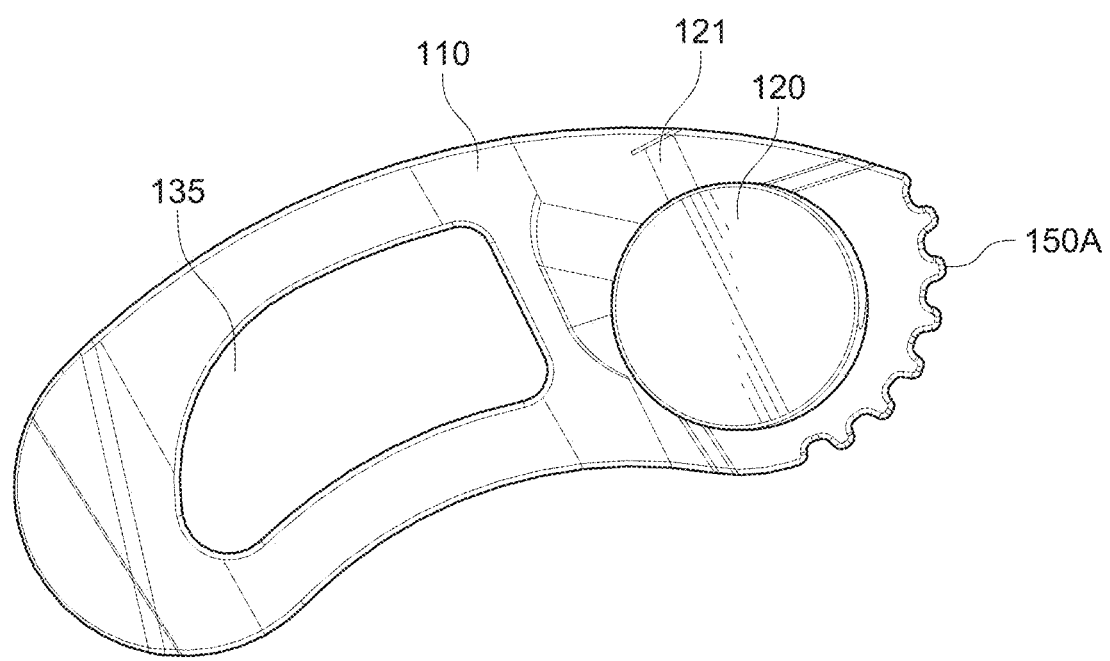
FIG. 5 is a top view of a spinal implant device in accordance with an example embodiment.
Figure 6:
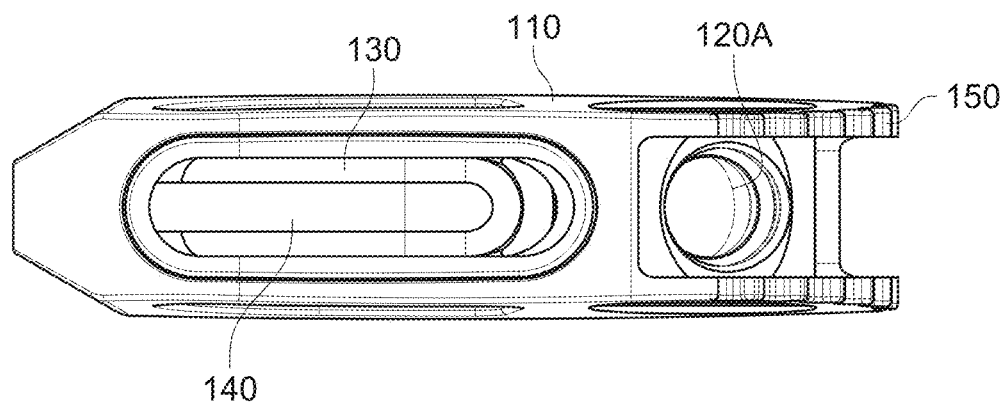
FIG. 6 is a side view of a spinal implant device in accordance with an example embodiment.

FIGS. 4-6 illustrate an example embodiment of a spinal implant device 100. As best shown in FIG. 4, the spinal implant device 100 may comprise a housing 110 which may form a rigid cage. The shape of the housing 110, and thus the overall profile of the spinal implant device 100, may vary in different embodiments and should not be construed as limited in scope by the example embodiment shown in FIGS. 4-6.

The housing 110 may comprise a curved configuration as shown. The housing 110 may comprise a pair of walls which are bridged together, with an interior cavity 140 defined between the walls. The housing 110 may include one or more openings 130, 135. In the example embodiment shown in FIG. 4, it can be seen that the housing 110 may include a side opening 130 and one or more top/bottom openings 135. In the example embodiment shown in FIGS. 4-6, the housing 110 may include a single side opening 130 and a pair of opposing top/bottom openings 135.

The shape, positioning, size, and orientation of any such openings 130, 135 may vary in different embodiments and thus should not be construed as limited in scope by the example embodiment shown in FIGS. 4-6. As discussed in more detail below, a mesh portion 160 may be positioned within the cavity 140 and configured to expand outwardly through the side opening 130. Bone void filler 170 may be pushed out of the housing 110 through one or more of the bottom and/or side openings 130, 135 as discussed herein.

Continuing to reference FIGS. 4-6, it can be seen that the housing 110 may include a rotatable hub 120 which may be rotatably connected to the housing 110. The rotatable hub 120 may comprise a substantially cylindrical member having a threaded opening 120A formed therein. The threaded opening 120A may be configured to removably and threadably engage with the corresponding connector 230 of the delivery device 200 so as to removably attach the spinal implant device 100 to the delivery device 200. As previously mentioned, although FIG. 4 illustrates that the threaded opening 120A comprises a female connector, it should be appreciated that, in some embodiments, the threaded opening 120A may instead comprise a threaded fastener forming a male connector instead.

The housing 110 may be configured to rotate about the rotatable hub 120 such that the angular orientation of the housing 110, and thus the overall spinal implant device 100, may be varied with respect to the delivery device 200 when the spinal implant device 100 is attached to the delivery device 200.

Rotation of the rotatable hub 120, or rotation of the housing 110 about the rotatable hub 120, may adjust the orientation of the threaded opening 120A between a sealed position and an unsealed position as discussed herein. In the unsealed position, the threaded opening 120A may be in fluid communication with the cavity 140 so as to allow injection or introduction of bone void filler 170 into the cavity 140 or, more specifically, into the mesh portion 160 positioned within the cavity 140 as discussed in more detail below. In the sealed position, the threaded opening 120A may not be in fluid communication with the cavity 140 so as to prevent premature injection or introduction of bone void filler 170 into the cavity 140.

The range of rotational movement of the rotatable hub 120 may be limited. The range may vary in different embodiments to suit different uses and different anatomies. The manner by which rotational movement is so limited may vary in different embodiments. In an example embodiment, the housing 110 may include a stopper pin 121 such as shown in FIG. 5 which slides within an arcuate slot formed in the rotatable hub 120, thereby limiting rotational movement past certain points.

As best shown in FIGS. 4-6, a proximal portion of the spinal implant device 100 may a locking mechanism 150 which may engage with the corresponding locking mechanism 226 of the delivery device 200 to prevent angular pivoting of the spinal implant device 100 with respect to the delivery device 200. In the example embodiment shown in FIGS. 4-6, the locking mechanism 150 may comprise a plurality of teeth 150A. The teeth 150A of the locking mechanism 150 may be formed additively (e.g., by projections) or subtractively (e.g., by indentations).

The shape, spacing, number, orientation, and configuration of the teeth 150A may vary in different embodiments, and thus should not be construed as limited in scope by the example embodiments shown in the figures. In some embodiments, the spacing between adjacent teeth 150A may vary so as to provide audible (e.g., clicking) or haptic feedback regarding the angular orientation of the spinal implant device 100.

As best shown in FIGS. 4-5, 7C-7D, 7F, 8A, 8D-8E, and 17B, the positioning of the teeth 150A with respect to the rotatable hub 120 may vary along the arcuate path of the teeth 150A, forming a nautilus curve. Put differently, the width of the locking mechanism 150 between the rotatable hub 120 and the teeth 150A may narrow along the arcuate path of the teeth 150A. The use of such a nautilus shape may provide various benefits, including but not limited to providing feedback on orientation of the spinal implant device 100 with respect to the delivery device 200 by, e.g., providing differential rotation of the collar 211 (described in more detail below). However, it should be appreciated that, in some embodiments, such a nautilus curvature may be omitted such as shown in, e.g., FIGS. 13A-13B.

Figure 11:
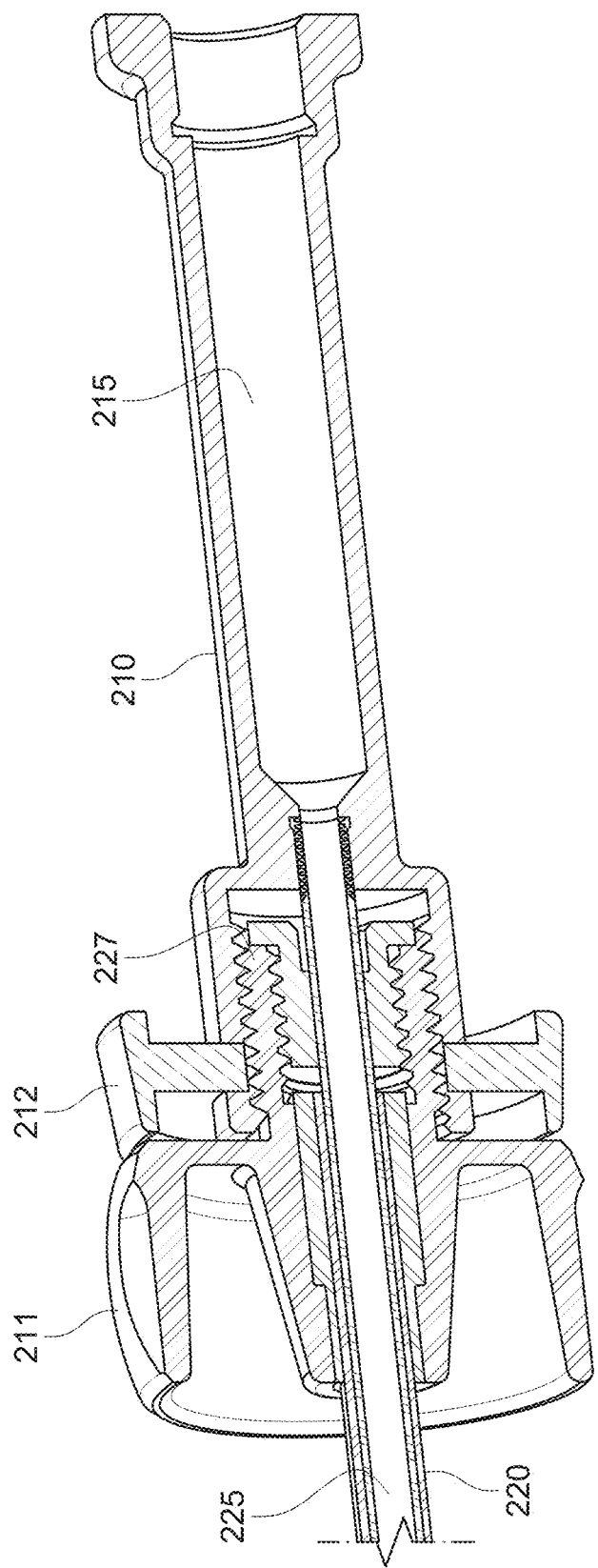
FIG. 11 is a side sectional view of a handle of a delivery device in accordance with an example embodiment.

The manner by which the nautilus curvature provides feedback may vary in different embodiments. With reference to FIG. 11, it can be seen that the main handle 210 may be attached to the inner tubular member 220B and that the collar 211 may be attached to the outer tubular member 220A. The internal interface between these components may comprise a threaded connection 227. When the collar 211 is adjusted, such as by rotatable actuation, relative to the main handle 210, the outer tubular member 220A may longitudinally translate with respect to the inner tubular member 220B.

Continuing to reference FIG. 11, it can be seen that the outer tubular member 220A may comprise a plurality of locking teeth 226A at its end portion which may engage with the teeth 150A on the outer curve of the locking mechanism 150 of the spinal implant device 100. The translation of the outer tubular member 220A may retract and extend the locking teeth 226A to release and engage the teeth 150A of the spinal implant device 100. The connection of the delivery device 200 to the spinal implant device 100 may be maintained intact during the locking and unlocking of the respective teeth 150A, 226A, as the male threaded connection of the delivery device 200 may remain engaged with the threaded opening 120A of the rotatable hub 120.

The nautilus shape of the teeth 150A of the locking mechanism 150 of the spinal implant device 100 may result in differential translation of the outer tubular member 220A relative to the inner tubular member 220B. As an example, when the delivery device 200 is attached to the spinal implant device 100 in the straight, linear position for initial insertion, the collar 211 may be at a more "retracted" position since there is more space between the teeth 150A and the rotatable hub 120.

As the spinal implant device 100 is articulated to its greatest angled orientation, the locking teeth 226A may extend farther than the first straight position, as there is less space between the teeth 150A and the rotatable hub 120. This differential shape of the locking mechanism 150 may result in differential translation of the outer tubular member 220A relative to the inner tubular member 220B due to greater degrees of rotation of the collar 211 (e.g., there may be 180 degrees of greater rotation of the collar 211 between the straight and fully articulated position of the spinal implant device 100).

In some example embodiments, an additional collar 212 which may function as a tare indicator ring may be positioned between the collar 211 and the main handle 210 such as shown in, e.g. FIGS. 15A-16B. Indicia 212A, 212B, 213A, 213B on the collar 212 may provide reference positions relative to corresponding indicia 211A on the collar 211. The differential rotation of the collar 211 between the straight and fully articulated positions thus may provide feedback to the user on the handle end (as the spinal implant device 100 is not visible once inside the spinal disc space) indicating when the spinal implant device 100 is fully articulated and the outlet port 125 is unsealed and ready to receive bone void filler 160.

As best shown in FIGS. 7A-7F, the spinal implant device 100 may comprise a mesh portion 160. The mesh portion 160 may be secured at least partially within the cavity 140 of the housing 110. The mesh portion 160 may form a flexible, expandable, secondary mesh cage in combination with the rigid cage of the housing 110. The mesh portion 160 may comprise a mesh having a plurality of permeable pores through which a bone void filler 170 may interface with the adjacent vertebra 400.

Figure 7A:
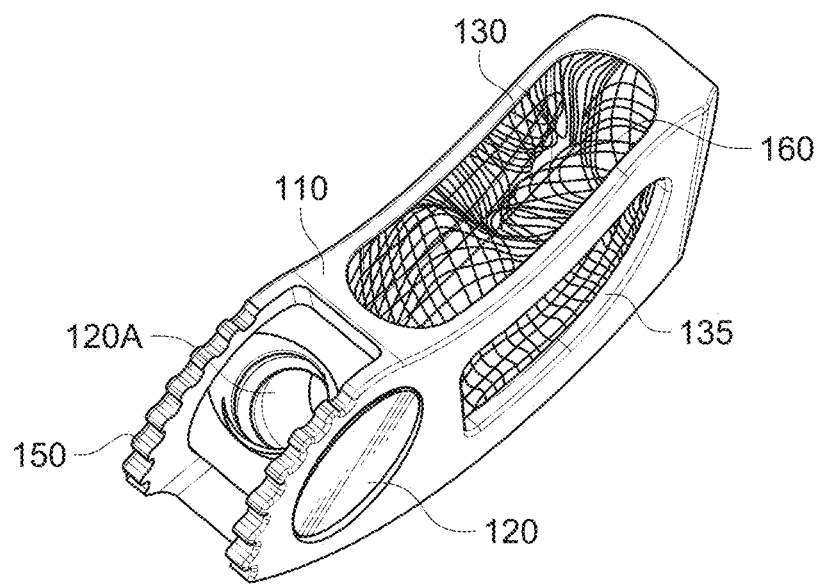
FIG. 7A is a perspective view of a spinal implant device including a mesh portion in a collapsed configuration in accordance with an example embodiment.

The mesh portion 160 may be adjustable between a collapsed configuration, in which the mesh portion 160 is substantially positioned within the cavity of the housing 110, and an expanded configuration, in which the mesh portion 160 at least partially expands out of one or more of the openings 130, 135 of the housing 110. FIG. 7A illustrates an example embodiment in which the mesh portion 160 is in the collapsed configuration. FIGS. 7B-7F illustrate example embodiments in which the mesh portion 160 is in the expanded configuration.

Figure 7B:
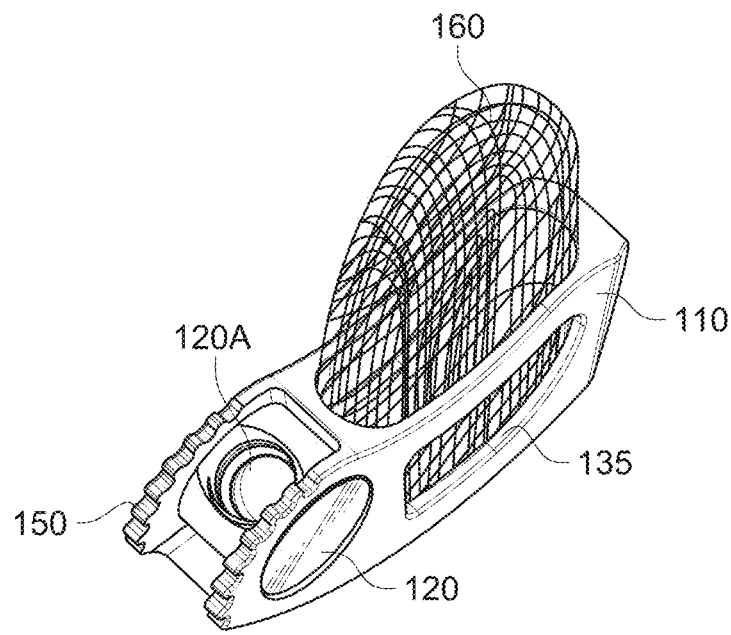
FIG. 7B is a perspective view of a spinal implant device including a mesh portion in an expanded configuration in accordance with an example embodiment.
Figure 7C:
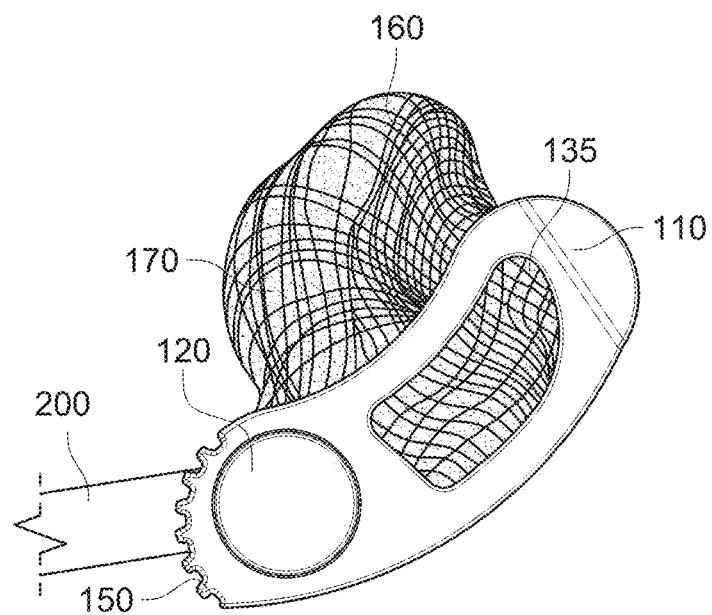
FIG. 7C is a top view of a spinal implant device containing a bone void filler in accordance with an example embodiment.

The mesh portion 160 may be composed of various materials, including shape memory materials such as Nitinol. The mesh portion 160 may be heat set to expand to a particular shape, such as a bag or sac shape as shown in FIG. 7B. The manner by which the mesh portion 160 is expanded may vary. In the example embodiment shown in FIG. 7C, it can be seen that force from injected or introduced bone void filler 170 may expand the mesh portion 160, with bone void filler 170 interfacing with the adjacent vertebra 400 through the pores of the mesh portion 160.

The shape, size, spacing, and number of pores of the mesh portion 160 may vary in different embodiments and thus should not be construed as limited in scope by the example embodiments shown in the figures. FIGS. 7C-7F, for example, illustrate example embodiments having different shapes for the expanded mesh portions 160. It should be appreciated that various other shapes may be utilized.

The mesh portion 160 may be formed from one or more braided wires. The manner by which the mesh portion 160 itself is manufactured may vary, including the use of a mandrel. The manner by which the mesh portion 160 is secured to the housing 110 may also vary, including but not limited to the use of welding, adhesives, clamps, frictional engagement, and the like.

FIGS. 14 and 17A-18 illustrate an example embodiment in which a tapered insert 165 may be utilized to removably or fixedly secure the mesh portion 160 within the cavity 140 of the housing 110. The tapered insert 165 may have a tapered width or height which substantially matches with a corresponding taper in the cavity 140 of the housing 110.

Figure 17A:
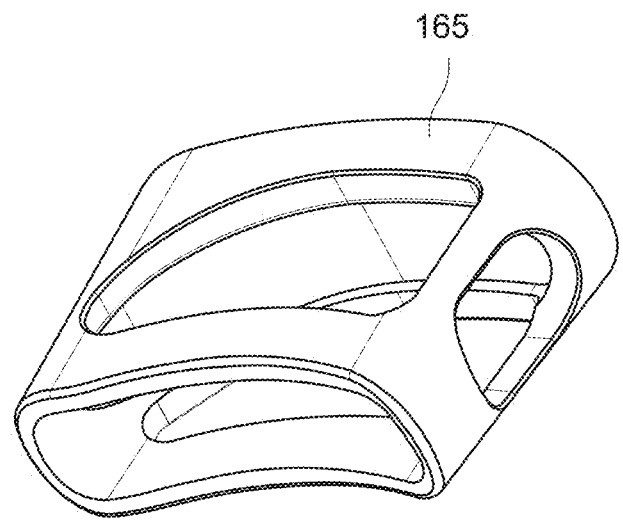
FIG. 17A is a perspective view of an insert of a spinal implant device in accordance with an example embodiment.
Figure 17B:
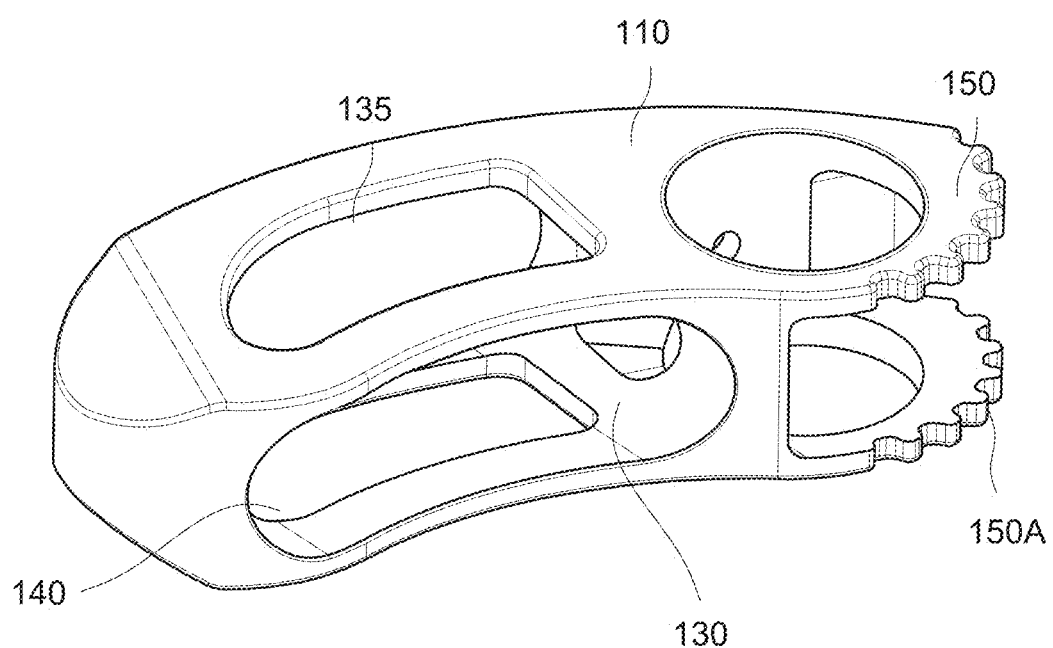
FIG. 17B is a perspective view of a spinal implant device in accordance with an example embodiment.

FIG. 17A illustrates an example embodiment of a tapered insert 165. FIG. 17B illustrates the housing 110 including its cavity 140 into which the tapered insert 165 may be inserted. It can be seen that the tapered insert 165 may include one or more openings formed in its body that may substantially correspond with one or more openings 130, 135 of the housing 110. It should be appreciated, however, that the shape, size, and configuration of the tapered insert 165, including the positioning and/or number of such openings, may vary in different example embodiments and thus should not be construed as limited by the example embodiments shown in the figures.

Figure 18:
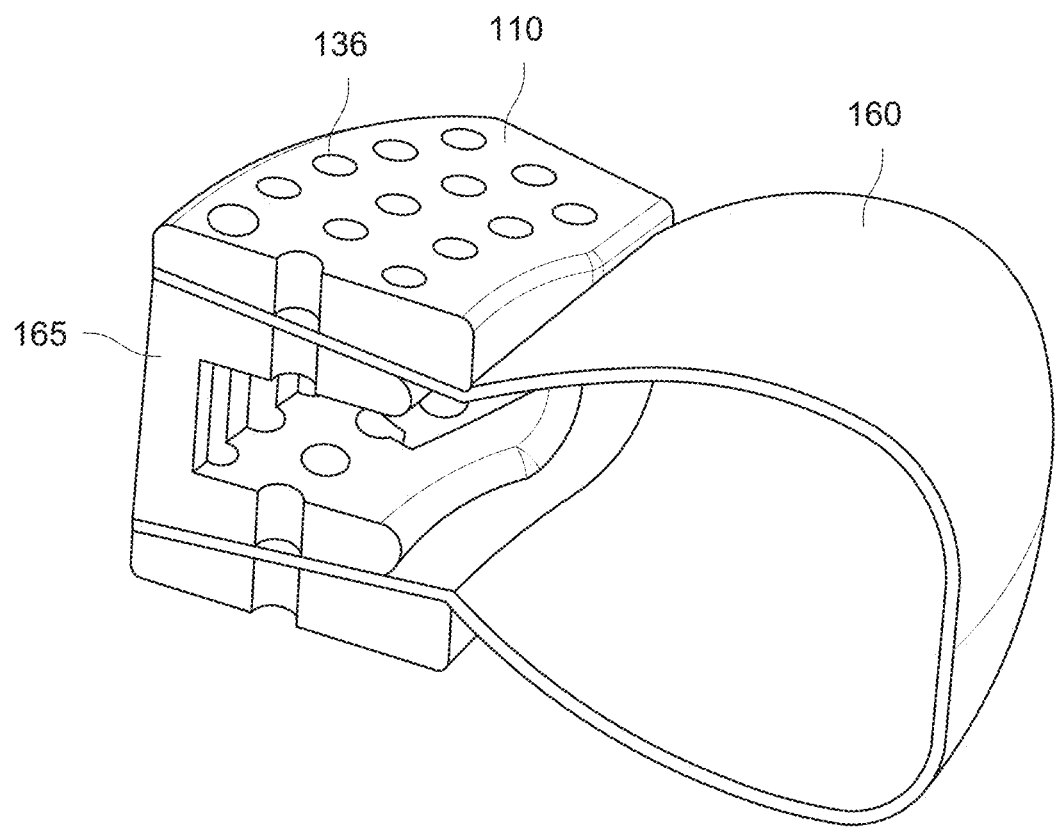
FIG. 18 is a cutaway view of a spinal implant device including an insert and a mesh portion in accordance with an example embodiment.

FIG. 18 is a cutaway view illustrating how the tapered insert 165 may fit within the cavity 140 of the housing 110 and how the mesh portion 160 may be sandwiched between the tapered insert 165 and the housing 110. As shown, respective ends of the mesh portion 160 may be frictionally engaged between the tapered insert 165 and the interior walls of the housing 110. However, as previously discussed, various other methods and/or mechanisms may be utilized to secure the mesh portion 160 to the housing 110 of the spinal implant device 100 in various example embodiments.

Figure 19A:
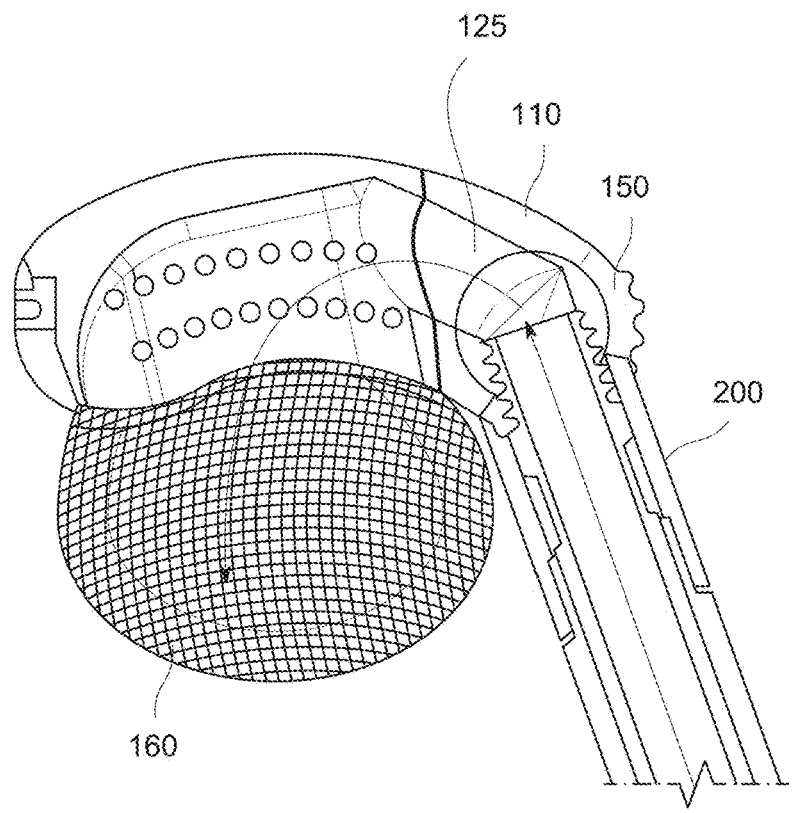
FIG. 19A is a top view of a spinal implant device and a delivery device illustrating bone void filler flow path in accordance with an example embodiment.
Figure 19B:
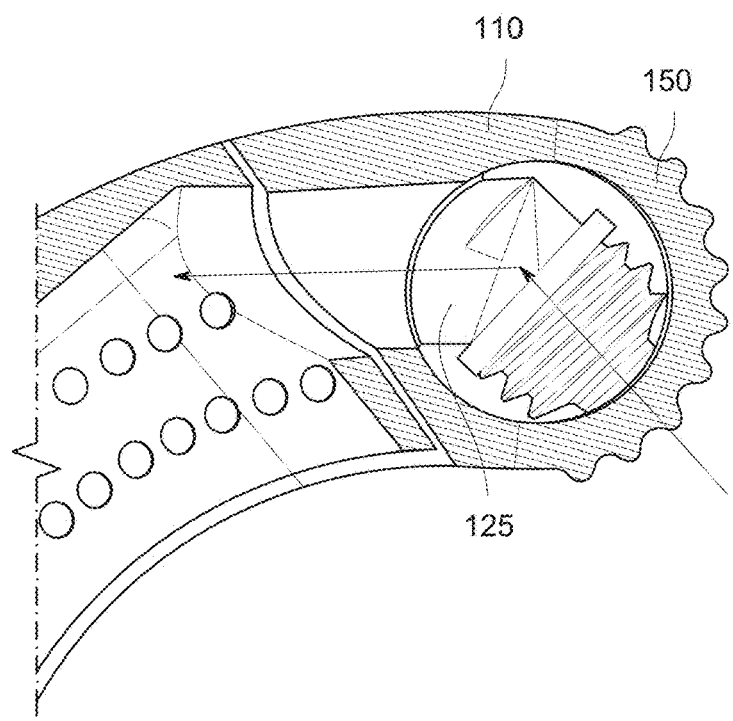
FIG. 19B is a top sectional view of a spinal implant device illustrating bone void filler flow path in accordance with an example embodiment.

The use of a tapered insert 165 may provide various benefits, including by acting to guide the flow of the bone void filler 170 into the mesh portion 160. FIGS. 19A-19B illustrate a flow path of the bone void filler 170 from the delivery device 200, through the housing 110, and into the mesh portion 160. The inward taper of the tapered insert 165 and cavity 140 of the housing 110 may aid in promoting flow of the bone void filler 170 into the mesh portion 160. The bone void filler 170 may curl as it flows into the mesh portion 160.

Figure 8A:
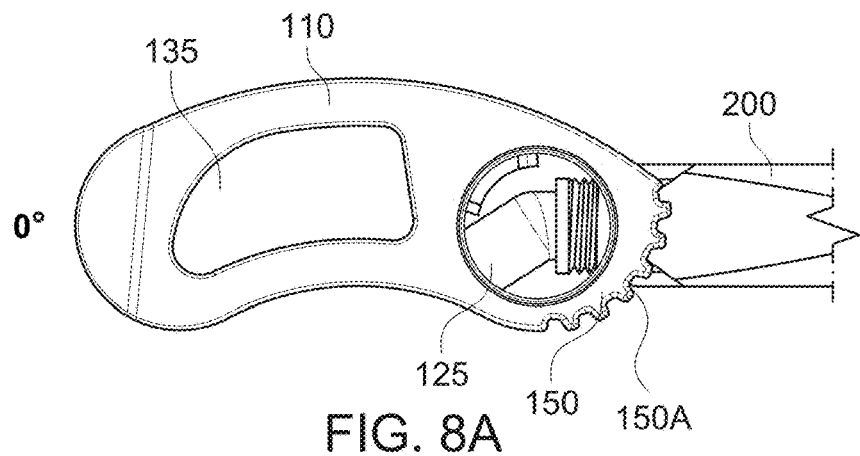
FIG. 8A is a top cutaway view of a spinal implant device in a substantially linearly aligned position in accordance with an example embodiment.
Figure 8B:
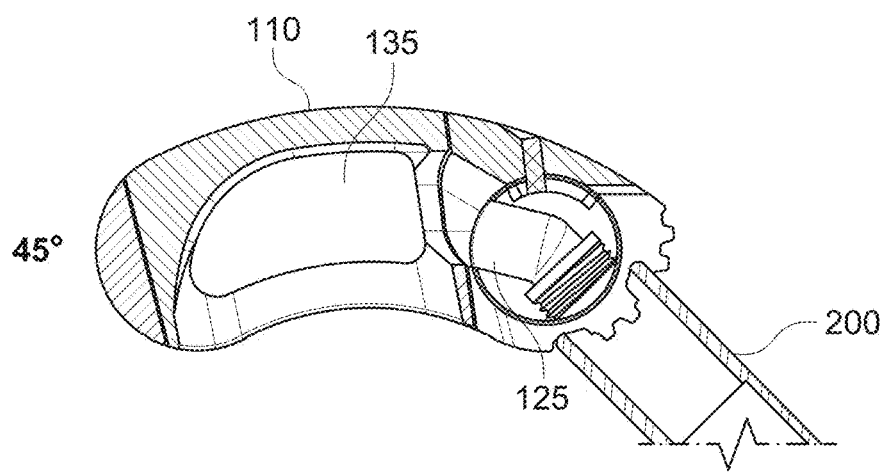
FIG. 8B is a top sectional view of a spinal implant device in a first angular orientation in accordance with an example embodiment.
Figure 8C:
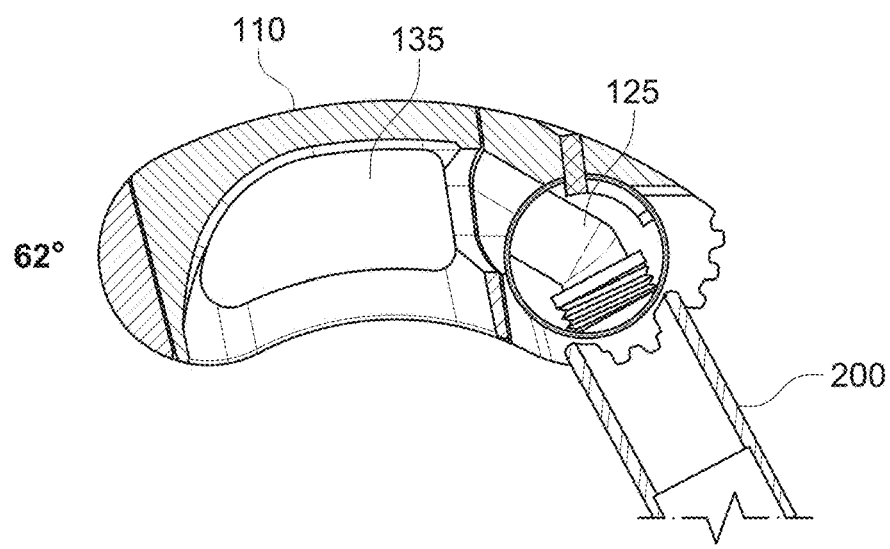
FIG. 8C is a top sectional view of a spinal implant device in a second angular orientation in accordance with an example embodiment.

FIGS. 8A-8C illustrate adjustment of the rotatable hub 120 between a plurality of positions with respect to the cavity 140 of the housing 110. In this manner, flow of the bone void filler 170 may be prevented until such time as desired. In an example embodiment, an outlet port 125 may be fluid communication with the threaded opening 120A of the rotatable hub 120 such that the outlet port 125 rotates with the rotatable hub 120.

In a sealed configuration, the outlet port 125 may be sealed against an interior wall of the housing 110 such as shown in FIG. 8A. In an unsealed configuration, the outlet port 125 may be at least in partial fluid communication with the cavity 140 of the housing 110 such that bone void filler 170 may flow from the delivery device 200 through the threaded opening 120A and outlet port 125, and into the cavity 140. FIG. 8B illustrates a partially unsealed configuration and FIG. 8C illustrates a fully unsealed configuration. Although not shown, a gasket or other sealing mechanism may also be utilized to effectuate the seal.

As should be evident from FIGS. 8A-8C, pivoting movement of the housing 110 may be operable to adjust the outlet port 125 between its various positions. FIG. 8A illustrates an example embodiment in which the housing 110 is substantially linearly aligned with the delivery device 200 (e.g., at a 0 degree angle). In such an orientation, the outlet port 125 may be sealed. FIG. 8B illustrates an example embodiment in which the housing 110 is oriented at about a 45 degree angle with respect to the delivery device 200. In such an orientation, the outlet port 125 may be partially unsealed. FIG. 8C illustrates an example embodiment in which the housing 110 is oriented at about a 62 degree angle with respect to the delivery device 200. In such an orientation, the outlet port 125 may be fully unsealed (e.g., in full fluid communication with the cavity 140 such that flow is not impeded).

Figure 8D:
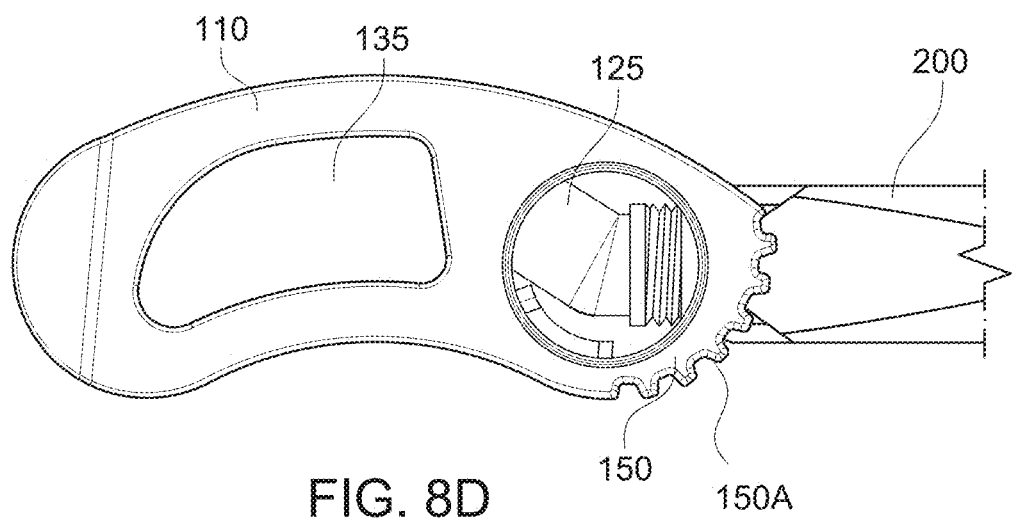
FIG. 8D is a top view of a spinal implant device in a substantially linearly aligned position in accordance with an example embodiment.
Figure 8E:
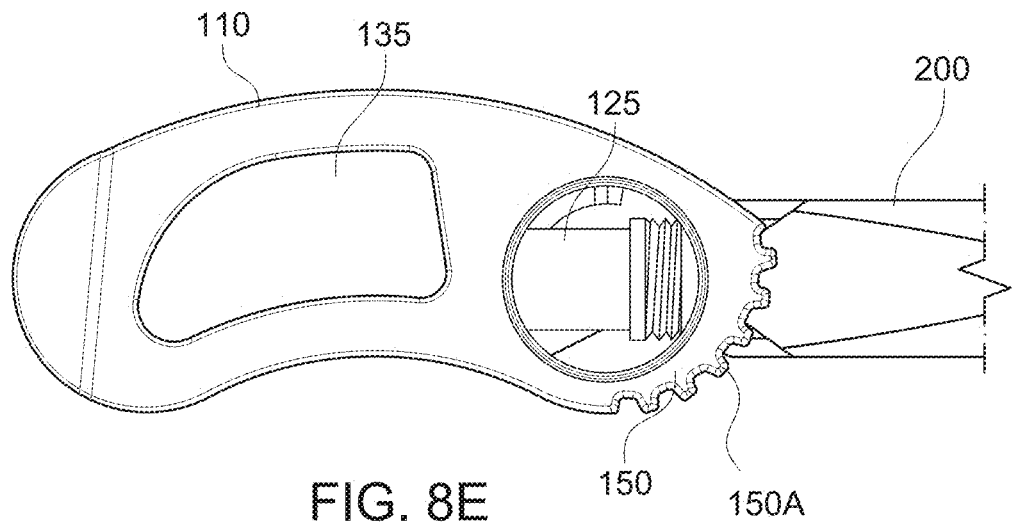
FIG. 8E is a top view of a spinal implant device in a substantially linearly aligned position in accordance with an example embodiment.

FIGS. 8D-8E illustrate additional example embodiments in which the outlet port 125 is fixed in the unsealed position when the spinal implant device 100 is in substantial linear alignment with the delivery device 200. FIG. 8D illustrates an example embodiment in which the outlet port 125 may be slightly angled, but still remain in fluid communication with the cavity 140 of the housing 110. FIG. 8E illustrates an example embodiment in which the outlet port 125 may be linearly aligned with the delivery device 200. Such example embodiments may be useful in cases in which the angular orientation of the spinal implant device 100 does not need to be adjusted for implantation. For example, such cases may include treatment of a patient having scoliosis (e.g., on the concavity side).

Thus, it should be appreciated that, in some example embodiments, the outlet port 125 may remain in an unsealed position in that the outlet port 125 remains aligned with the cavity 140 of the housing 110. However, separate sealing mechanisms, such as valves or the like, may be utilized to seal or unseal the outlet port 125 in such example embodiments without the need for pivoting the outlet port 125. In such example embodiments, the hub 120 may not be rotatable.

Figure 9A:
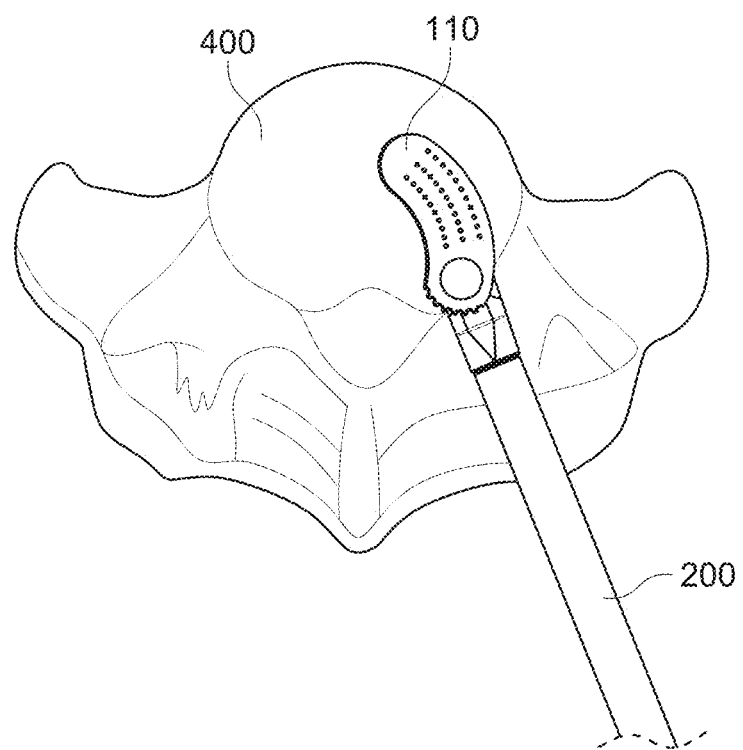
FIG. 9A is a top view of a spinal implant device during delivery in accordance with an example embodiment.
Figure 9B:
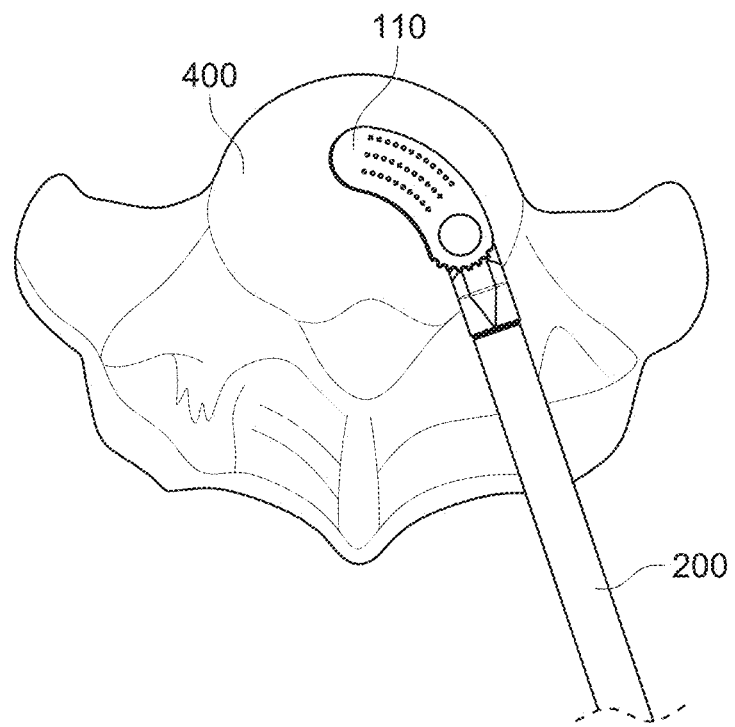
FIG. 9B is a top view of a spinal implant device during delivery in accordance with an example embodiment.
Figure 9C:
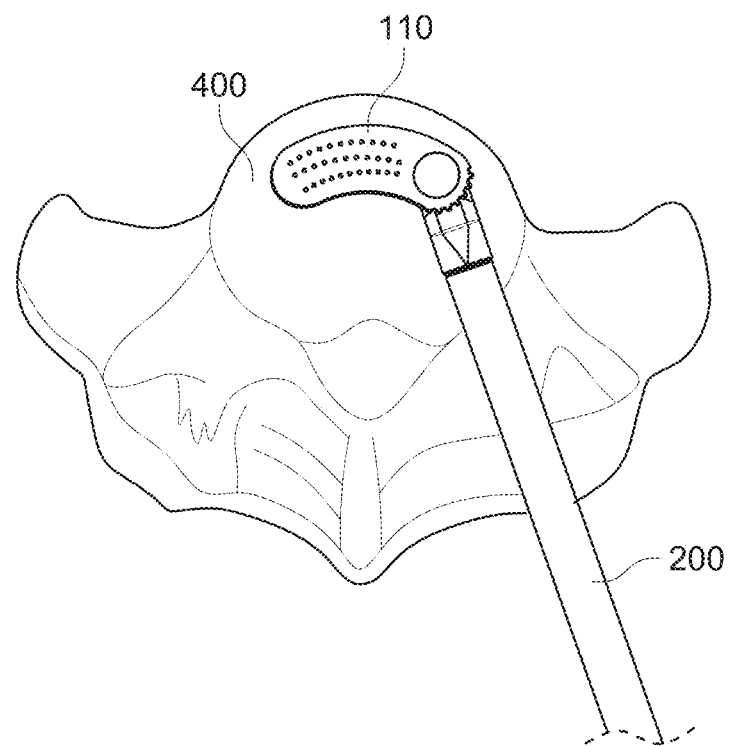
FIG. 9C is a top view of a spinal implant device during delivery in accordance with an example embodiment.

FIGS. 9A-9D illustrate an example embodiment of a spinal implant device 100 being positioned atop a vertebra 400. It should be appreciated that, while FIGS. 9A-9C illustrate an alternative example embodiment of the spinal implant device 100, the same principles may be applied to the example embodiment of the spinal implant device 100 shown in, e.g., FIGS. 8A-8C.

As shown in FIG. 9A, the spinal implant device 100 may be attached to the distal end of the delivery device 200 in a substantially linearly aligned orientation during delivery. The spinal implant device 100 may be locked in such a linear orientation, such as by use of the locking mechanisms 150, 226 as previously discussed.

As shown in FIGS. 9B-9C, the angular orientation of the spinal implant device 100 may be adjusted. FIG. 9B illustrates the spinal implant device 100 at a first angular orientation. FIG. 9C illustrates the spinal implant device 100 at a second, final angular orientation, ready for implantation. The final angular orientation upon implantation may vary to suit the anatomy of the patient, the condition being treated, and/or the preferences of the operator.

Figure 9D:
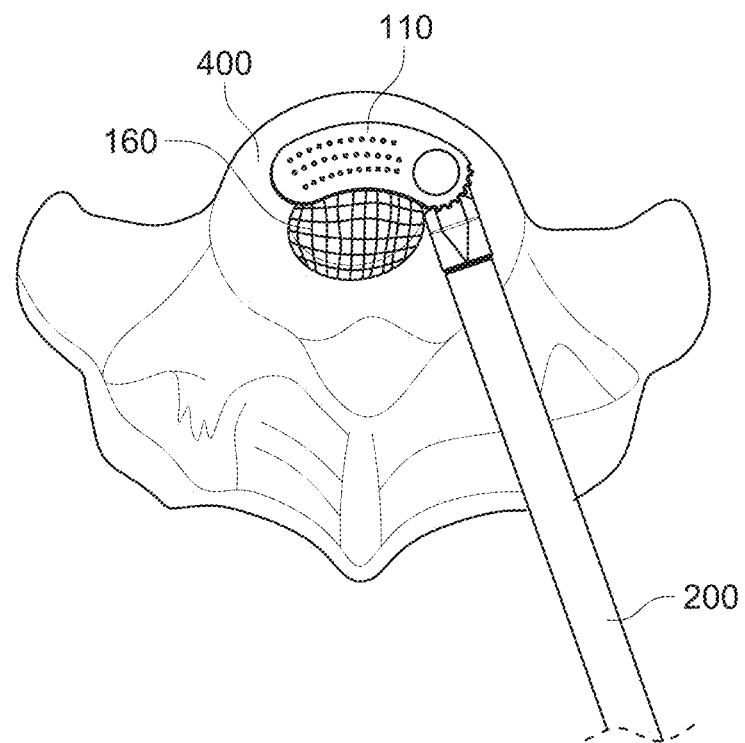
FIG. 9D is a top view of a spinal implant device during deployment in accordance with an example embodiment.

FIG. 9D illustrates an example embodiment in which the spinal implant device 100 is at its final, implanted orientation and the mesh portion 160 has been expanded out of the housing 110. Although bone void filler 170 is not illustrated for clarity, it should be appreciated that bone void filler 170 may typically fill the mesh portion 160 prior to removal of the delivery device 200. The use of the expanded mesh portion 160 may provide a number of benefits which have been previously discussed, including but not limited to a smaller incision, containment of bone void filler 170, load sharing, containment of a larger volume of bone void filler 170, and load distribution over a wider area.

Figure 10:
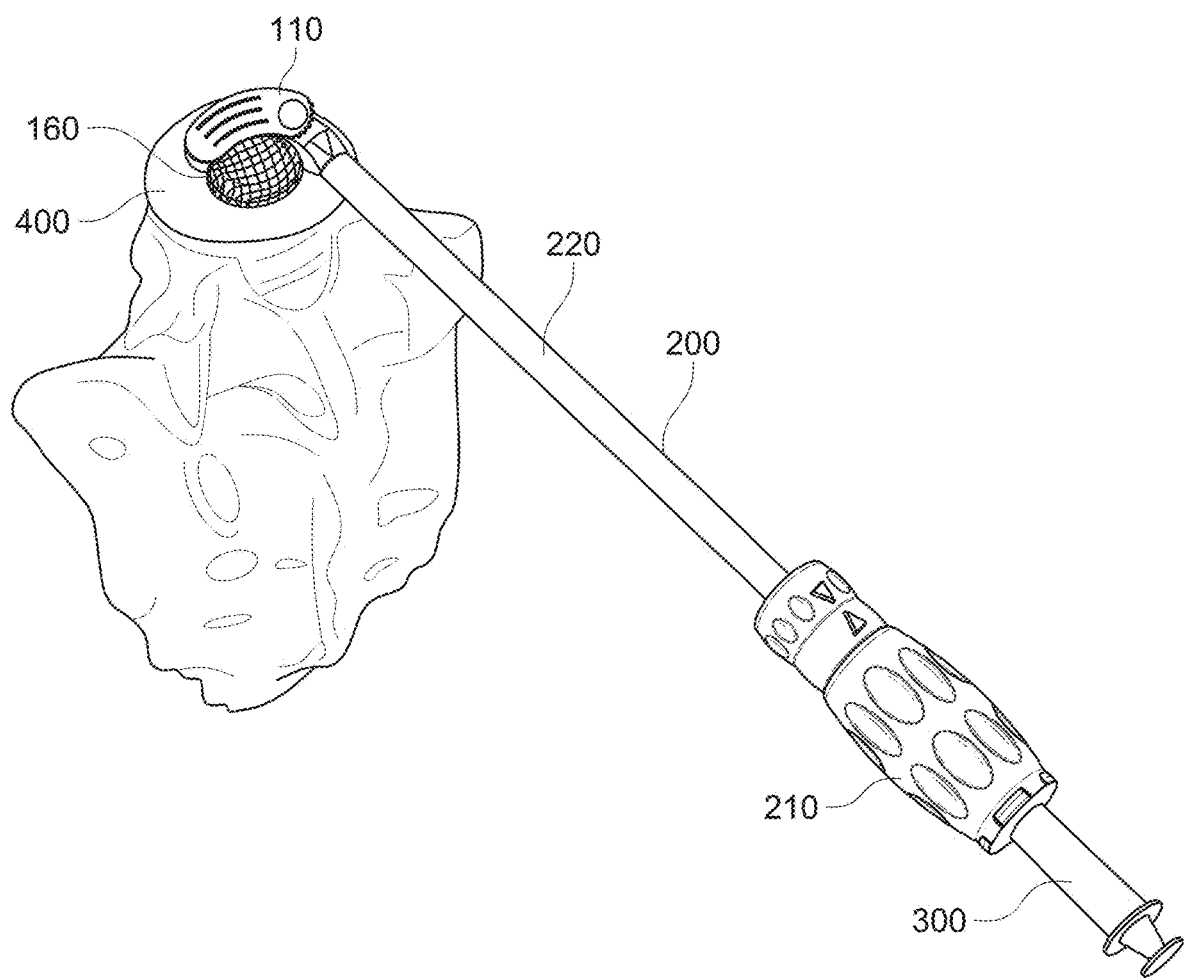
FIG. 10 is a perspective view of a spinal implant and delivery system during deployment in accordance with an example embodiment.

FIG. 10 illustrates an example embodiment of a delivery device 200 attached to an example embodiment of a spinal implant device 100, with the spinal implant device 100 being positioned atop a vertebra 400 and the mesh portion 160 having been expanded. Again, although bone void filler 170 is not shown in this view, it should be appreciated that bone void filler 170 would typically be present within the mesh portion 160 and, potentially, interdigitating in the pores to interface with the adjacent vertebrae 400. In the configuration shown in FIG. 10, the spinal implant device 100 has been positioned between a pair of vertebrae 400, the mesh portion 160 has been expanded (e.g., through injection of bone void filler 170 using the illustrated syringe 300), and the delivery device 200 is configured to disengage from the spinal implant device 100 by, e.g., rotation of the handle 210.

FIG. 11 illustrates a sectional view of the handle 210 of the delivery device 200, albeit with an outer covering removed for clarity. As illustrated, the handle 210 of the delivery device 200 may include a lumen 215, channel, or opening into which an injecting device, such as a syringe 300, packing rod 300A, and/or syringe gun 310 may be positioned for introduction of the bone void filler 170. It should be appreciated that FIG. 11 merely illustrates an example embodiment, and thus the cross-section of the handle 210 may vary in different embodiments.

Figure 12:
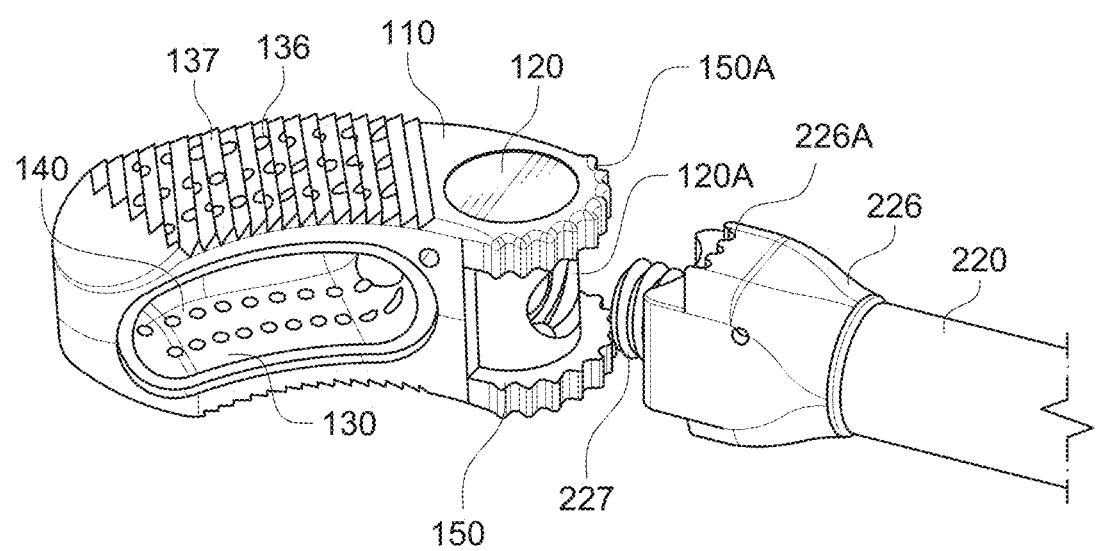
FIG. 12 is a perspective view of a spinal implant and delivery device in accordance with an example embodiment.

FIG. 12 illustrates an alternate example embodiment of a spinal implant device 100 in which the aforementioned top opening(s) 135 have been replaced by a plurality of small apertures 136. The apertures 136 may be utilized to disperse bone void filler 170 around the spinal implant device 100 after implantation. The apertures 136 may be positioned at various locations on the housing 110, including on the top and bottom walls as shown. The exterior of the top and/or bottom walls may also include ribs 137 or other projections to aid in retaining the implant device 100 in position.

Figure 13:
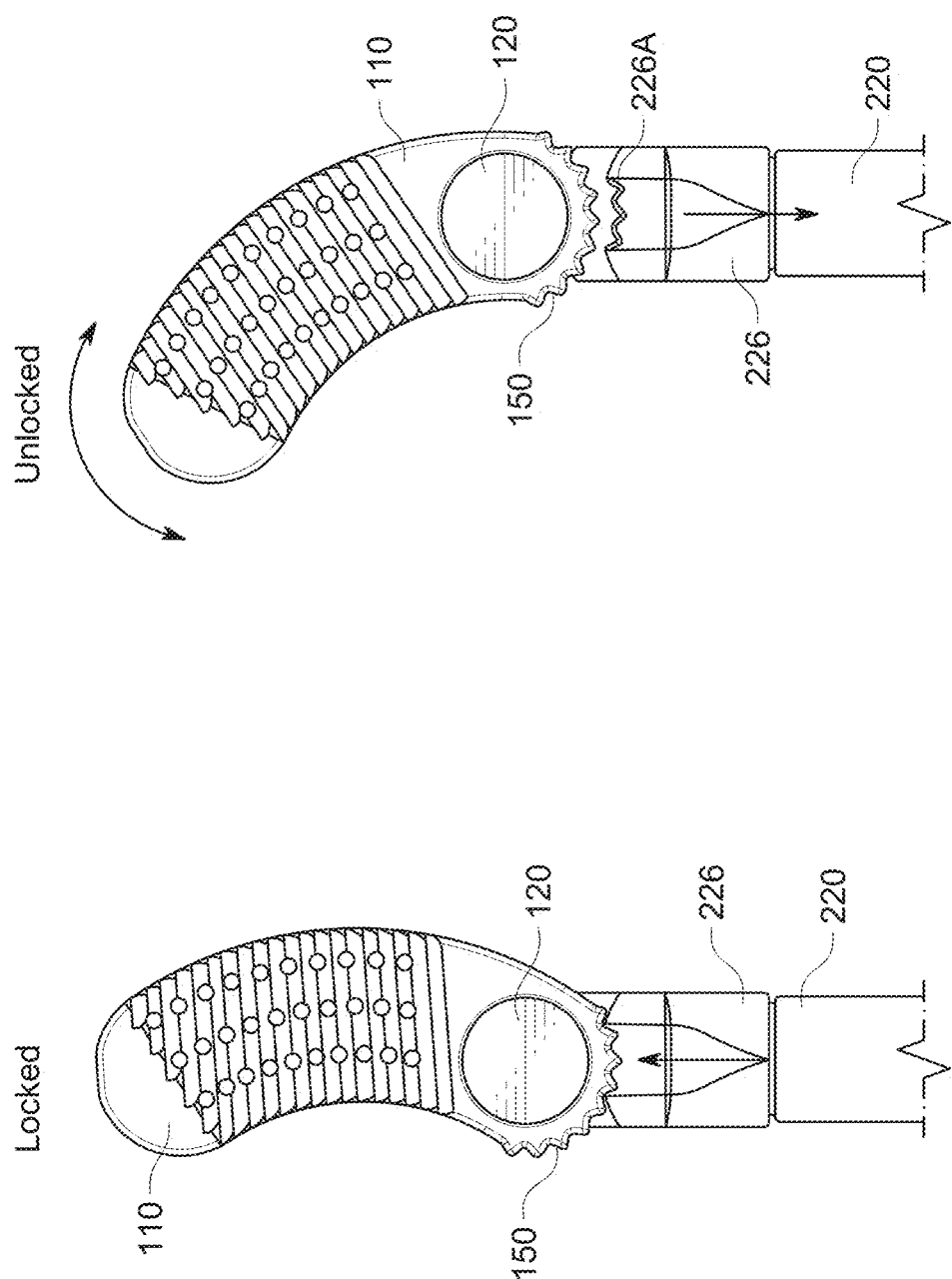
FIG. 13A is a top view of a spinal implant device in a locked configuration in accordance with an example embodiment.
FIG. 13B is a top view of a spinal implant device in an unlocked configuration in accordance with an example embodiment.
Figure 14:
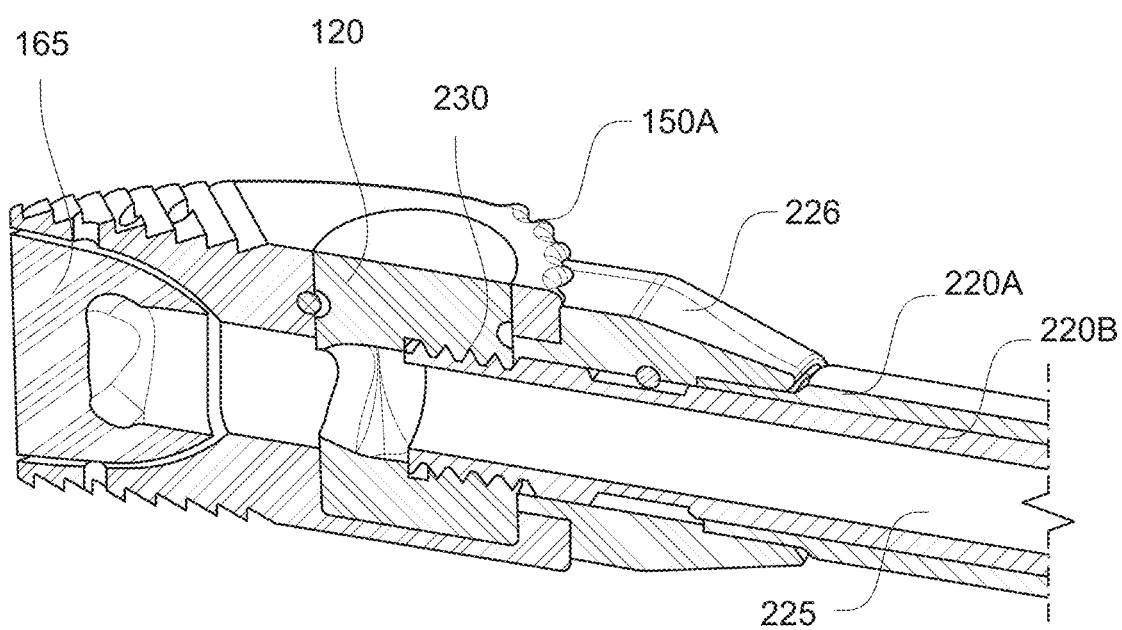
FIG. 14 is a sectional view of a spinal implant device and delivery device in accordance with an example embodiment.

FIGS. 13A-13B illustrate the locked and unlocked configurations of the spinal implant device 100 when attached to the delivery device 200. FIG. 13A illustrates the locked position, in which the teeth 150A of the locking mechanism 150 of the spinal implant device 100 are engaged with the teeth 226A of the locking mechanism 226 of the delivery device 200. FIG. 13B illustrates the unlocked position, in which the outer tube 220A of the elongated element 220 has been retracted, thereby disengaging the teeth 226A of the locking mechanism 226 of the delivery device 200 from the teeth 150A of the locking mechanism 150 of the spinal implant device 100. However, in some embodiments, the respective teeth 150A, 226A may be in contact even when unlocked, though not fully engaged, so as to provide an audible or haptic feedback as the spinal implant device 100 is adjusted between angular orientations.

FIGS. 15A-16B illustrate an example embodiment of a handle 210 including a pair of adjacent collars 211, 212 which may be utilized for various purposes, including but not limited to locking/unlocking adjustment of the spinal implant device 100 and/or adjusting an orientation of the spinal implant device 100. As shown, the collars 211, 212 may include indicia 211A, 212A, 212B, 213A, 213B which may represent various states of the spinal implant device 100. The indicia 211A, 212A, 212B, 213A, 213B may comprise various markings, engravings, colorings, different materials, attachments, or the like. Further, the illustrated symbols for the indicia 211A, 212A, 212B, 213A, 213B in the example embodiment illustrated in FIGS. 15A-16B should not be construed as limiting in scope.

Figure 15A:
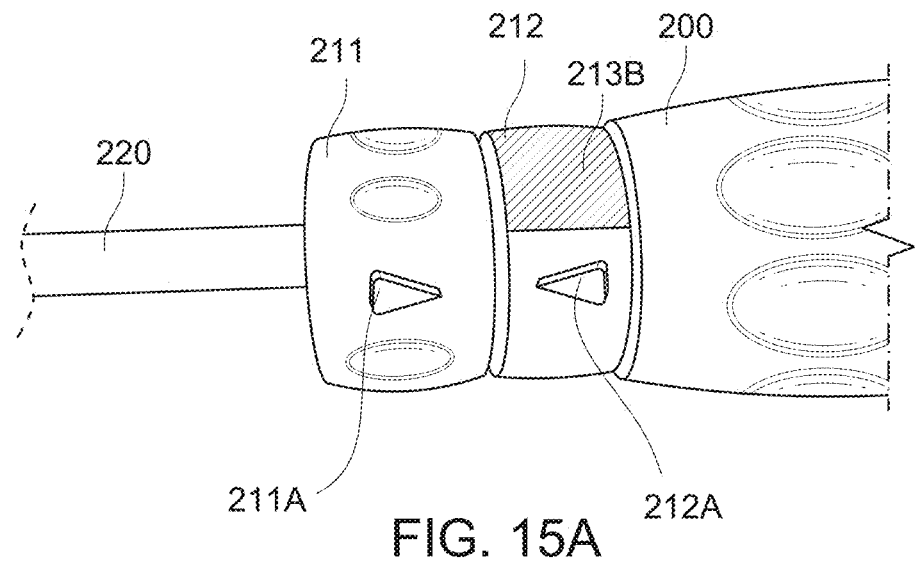
FIG. 15A is a side view of a handle of a delivery device in a locked position in accordance with an example embodiment.

FIG. 15A illustrates that the outer collar 211 may comprise an indicia 211A and the inner collar 212 may comprise an indicia 212A. In the illustrated example embodiment, both of the indicia 211A, 212A are illustrated as comprising arrows, though other symbols may be utilized. When the two indicia 211A, 212A are aligned as shown in FIG. 16A, it may indicate that the spinal implant device 100 is locked (e.g., by the respective teeth 150A, 226A being fully engaged) such that the spinal implant device 100 may not pivot.

Figure 15B:
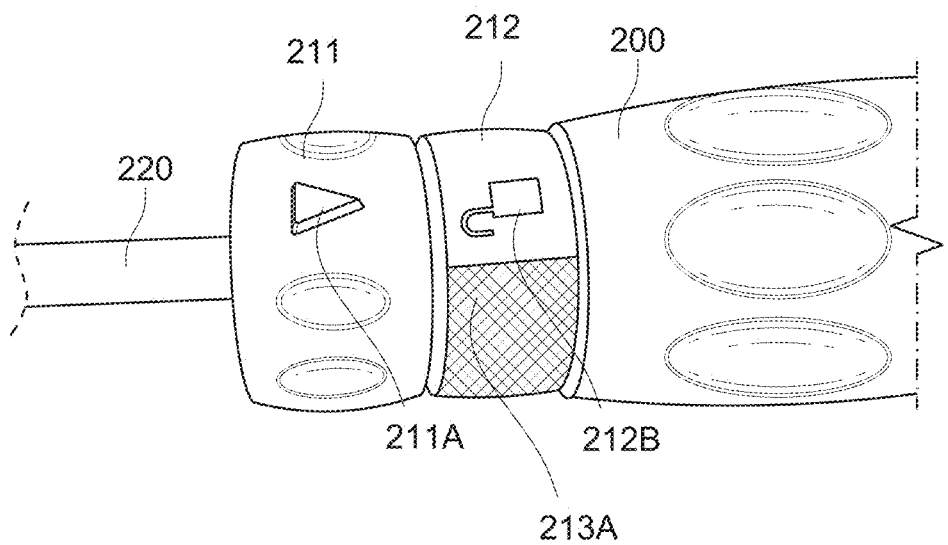
FIG. 15B is a side view of a handle of a delivery device in an unlocked configuration in accordance with an example embodiment.

FIG. 15B illustrates that the outer collar 211 has been rotated such that the indicia 211A of the outer collar 211 is aligned with an additional indicia 212B on the inner collar 212. In this example embodiment, the indicia 212B of the inner collar 212 is illustrated as comprising an unlock symbol, though other symbols may be utilized. When the two indicia 211A, 212B are so aligned, the spinal implant device 100 has been unlocked (e.g., by fully or partially disengaging the respective teeth 150A, 226B) such that the spinal implant device 100 may be pivoted between various angular orientations.

Figure 16A:
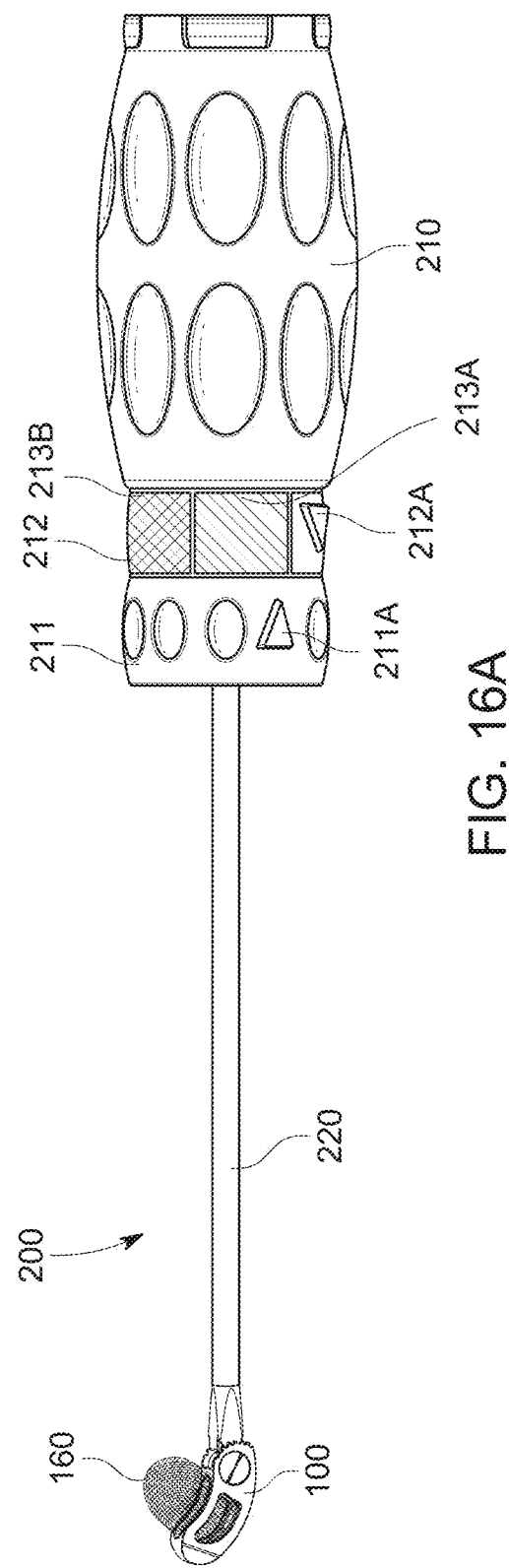
FIG. 16A is a side view of a spinal implant device and delivery device in a first position in accordance with an example embodiment.
Figure 16B:
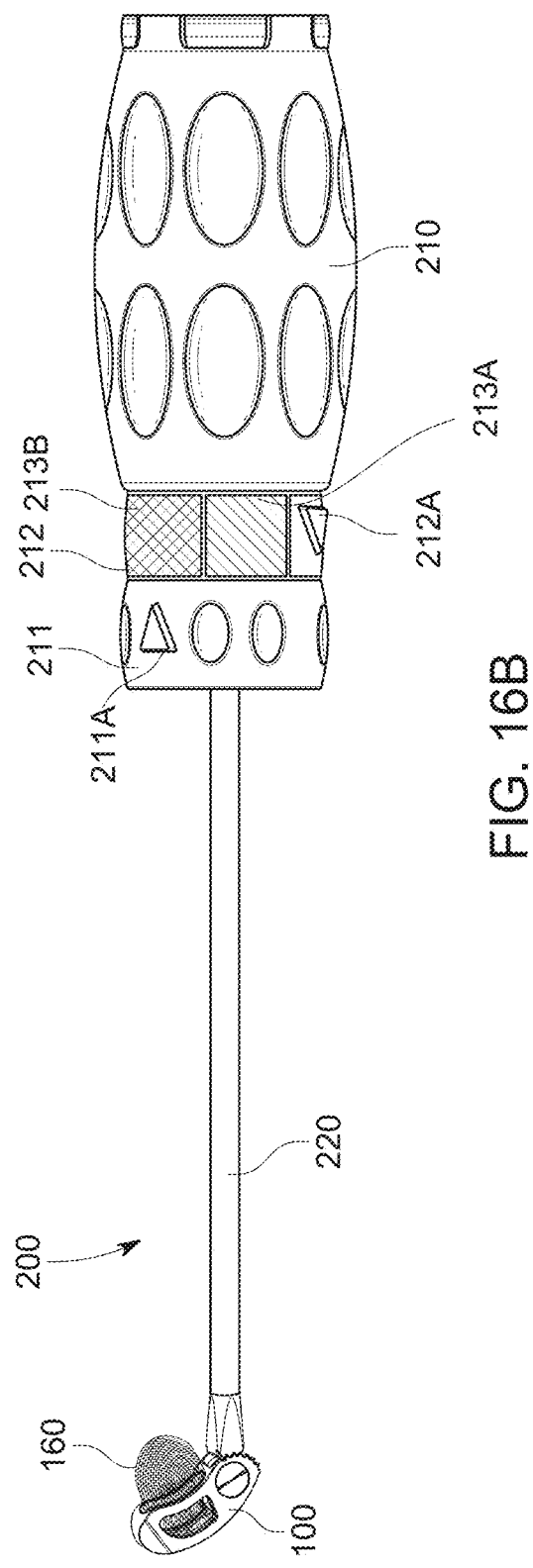
FIG. 16B is a side view of a spinal implant device and delivery device in a second position in accordance with an example embodiment.

FIGS. 16A-16B illustrate an example embodiment of adjustment of the angular orientation of the spinal implant device 100. As can be seen, the inner collar 212 may comprise additional indicia 213A, 213B representing a "sealed zone" and an "unsealed zone". The "sealed zone" may represent that the outlet port 125 is sealed and thus bone void filler 170 may not enter the cavity 140. The "unsealed zone" may represent that the outlet port 125 is at least partially unsealed and thus bone void filler 170 may enter the cavity 140. As the outer collar 211 is rotated, the indicia 211A on the outer collar 211 will pass through both zones until reaching the unlock symbol. Upon entering the "unsealed zone", in this example embodiment represented by the indicia 213A, an operator will know that bone void filler 170 may freely pass into the cavity 140. FIGS. 16A-16B also illustrate how the angular orientation of the spinal implant device 100 may be adjusted through various methods, such as by rotation of the outer collar 211.

In use, the spinal implant device 100 may first be attached to the distal end of the delivery device 200 by engaging the threaded connector 230 of the delivery device 200 within the threaded opening 120A of the spinal implant device 100. With the spinal implant device 100 attached to the delivery device 200, the spinal implant device 100 may be inserted in between two vertebrae 400 through an incision. A hammer may be utilized, if needed, to aid in positioning the spinal implant device 100.

With the spinal implant device 100 inserted in a cleared space between adjacent vertebrae 400, the handle 210 may be manipulated to unlock the spinal implant device 100 (such as by fully or partially disengaging the teeth 150A, 226A) and/or adjust an angular orientation of the spinal implant device 100 to a desired angular orientation. The indicia 211A, 212A, 212B, 213A, 213B may provide an indication of the positioning of the spinal implant device 100, as well as when the outlet port 125 has become unsealed. Differential rotation of the outer collar 211 may also provide feedback as to the orientation of the spinal implant device 100 with respect to the delivery device 200 due to the nautilus curvature of the locking mechanism 150 and teeth 150A.

Once the spinal implant device 100 is in the desired position and angular orientation, and the outlet port 125 is unsealed so as to be in fluid communication with the cavity 140 of the spinal implant device 100, bone void filler 170 may be injected or introduced through the delivery device 200 and into the mesh portion 160 of the spinal implant device 100. The bone void filler 170 may be guided into the mesh portion 160 by the tapered insert 165. As the bone void filler 170 fills the mesh portion 160, the mesh portion 160 will naturally expand out of the lower opening 130 of the housing 110 and into the space between the vertebrae 400. Some portion of the bone void filler 170 may also interdigitate through the mesh portion 160 of the spinal implant device 100 and/or one or more openings 130, 135 of the spinal implant device 100 so as to interface with adjacent vertebrae 400.

The manner by which the bone void filler 170 is injected or introduced may vary depending on the preferences of the operator and/or the properties of the bone void filler 170 being utilized. Example methods of injecting or introducing the bone void filler 170 may include, e.g., use of a syringe 300, syringe gun 310, and/or packing rod 300A. A packing rod 300A may be utilized by, e.g., placing bone void filler 170 into a rolled up metal foil or other material, inserting the rolled up metal foil or other material into a syringe 300, and then inserted the packing rod 300A through the metal foil or other material to drive the bone void filler 170 into the spinal implant device 100.

After injecting a sufficient amount of bone void filler 170, the delivery device 200 may be disengaged from the spinal implant 100 and removed from the body, leaving the spinal implant 100 in place.

In some circumstances, it may be desirable to remove the spinal implant device 100 for various reasons, such as during a revision surgery. The spinal implant device 100 may include one or more revision attachment points 115 to which a tool, which may comprise the same delivery tool 200 used to deliver the spinal implant device 100 or may comprise a separate tool, may attach to the spinal implant device 100 so that the spinal implant device 100 may be repositioned, reoriented, or removed outright.

Figure 7D:
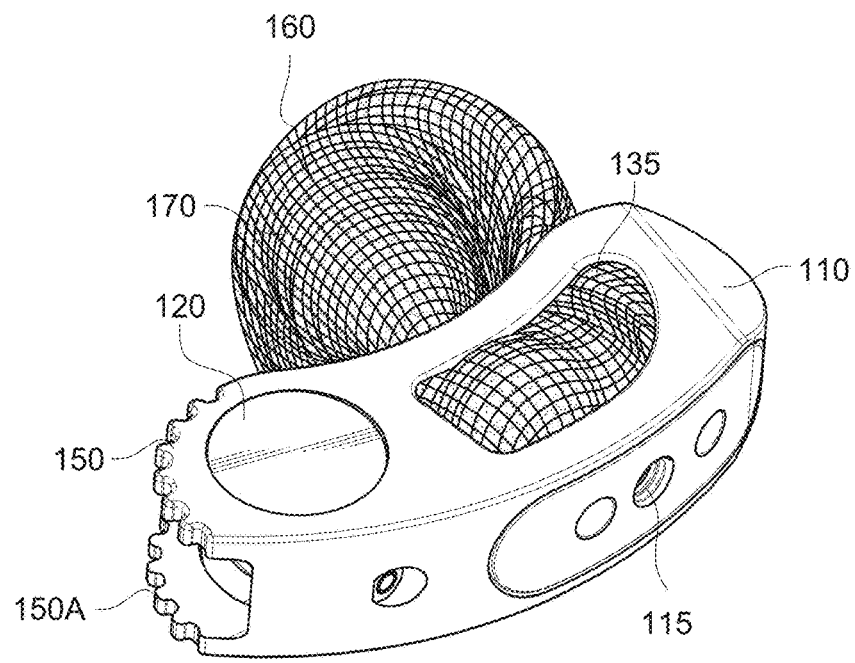
FIG. 7D is a perspective view of a spinal implant device containing a bone void filler in accordance with an example embodiment.
Figure 7E:
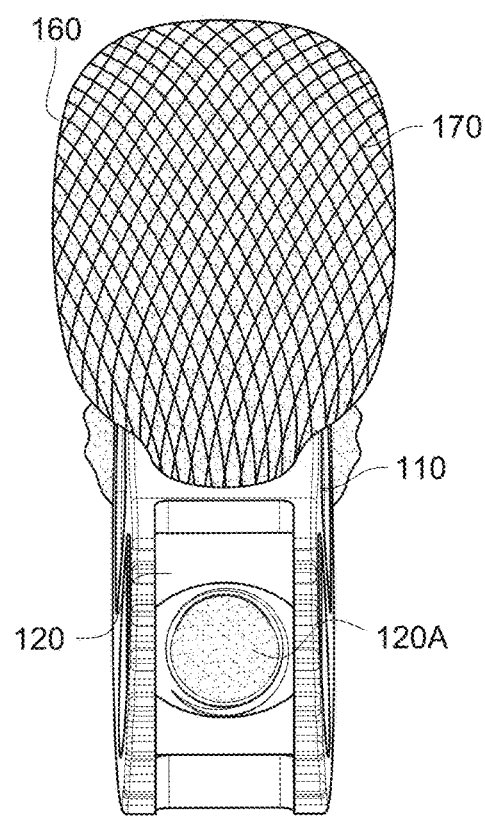
FIG. 7E is a side view of a spinal implant device containing a bone void filler in accordance with an example embodiment.
Figure 7F:
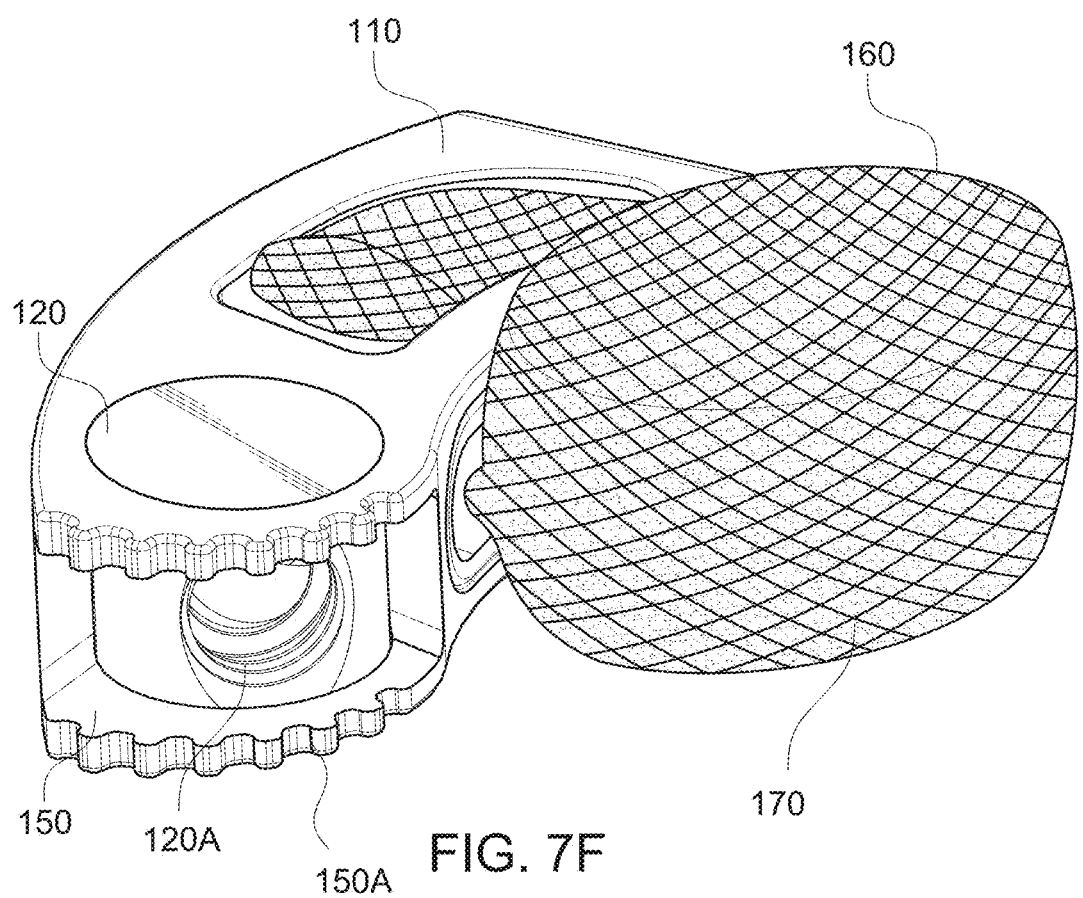
FIG. 7F is a top view of a spinal implant device containing a bone void filler in accordance with an example embodiment.

FIG. 7D illustrates an example embodiment of a revision attachment point 115 comprising a threaded opening positioned on a side of the housing 110. However, it should be appreciated that various other configurations may be utilized. For example, the positioning of the revision attachment point 115 may vary from what is shown in the example embodiment, including being positioned on other sides of the housing 110. As another example, the shape, size, and orientation of the revision attachment point 115 may vary from what is shown. Finally, while the revision attachment point 115 is illustrated as comprising a female connector, in some embodiments, a male connector may be utilized instead.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A spinal implant and delivery system, comprising:
   a delivery device, the delivery device including:
      a handle;
      an outer tubular member extending from the handle;
      wherein a distal end of the outer tubular member comprises a plurality of first teeth;
      an inner tubular member extending through the outer tubular member;
      wherein a distal end of the inner tubular member comprises a threaded connector;
   a spinal implant device, the spinal implant device being removably attachable to the delivery device and including:
      a housing including an inner cavity and a side opening;
      a mesh portion positioned within the inner cavity of the housing;
      a threaded opening for releasably engaging with the threaded connector of the delivery device;
      wherein the mesh portion is adjustable between a compressed configuration and an expanded configuration;
      wherein, in the expanded configuration, the mesh portion expands out of the side opening; and,
   wherein the delivery device is configured to inject or introduce a bone void filler to the spinal implant device.

2. The system of claim 1, wherein, when the spinal implant device is attached to the delivery device, the spinal implant device is adjustable between a locked configuration in which the spinal implant device is not angularly adjustable and an unlocked configuration in which the spinal implant device is angularly adjustable.

3. The system of claim 1, wherein the spinal implant device is adjustable between a plurality of angular orientations with respect to the delivery device.

4. The system of claim 1, wherein the bone void filler is deliverable to the spinal implant device through a lumen of the inner tubular member.

5. The system of claim 1, wherein a distal end of the outer tubular member includes a locking mechanism operable to lock or unlock an angular orientation of the spinal implant device with respect to the delivery device.

6. The system of claim 1, further comprising an injector for injecting the bone void filler through the delivery device and into the mesh portion of the spinal implant device.

7. The system of claim 6, wherein the injector is comprised of a syringe, a syringe gun, and/or a packing rod.

8. The system of claim 1, wherein the mesh portion is configured to expand into the expanded configuration upon introduction of the bone void filler.

* * * * *